United States Patent
Suga

(10) Patent No.: US 8,075,772 B2
(45) Date of Patent: Dec. 13, 2011

(54) OIL PAN WITH BUILT-IN FILTERING ELEMENT

(75) Inventor: Takeharu Suga, Aki-gun (JP)

(73) Assignee: Daikyonishikawa Corporation, Hiroshima-ke (JP)

( * ) Notice: Subject to any disclaimer, the term of this patent is extended or adjusted under 35 U.S.C. 154(b) by 1364 days.

(21) Appl. No.: 11/395,947

(22) Filed: Mar. 30, 2006

(65) Prior Publication Data

US 2006/0219620 A1 Oct. 5, 2006

(30) Foreign Application Priority Data

Mar. 31, 2005 (JP) ................................ 2005-102386
Mar. 31, 2005 (JP) ................................ 2005-103140

(51) Int. Cl.
*B01D 35/30* (2006.01)
*C02F 1/00* (2006.01)
*F01M 11/03* (2006.01)

(52) U.S. Cl. .............. 210/232; 210/167.01; 210/167.02; 210/416.5; 210/435; 210/445; 210/453; 210/454; 184/6.24; 184/106; 123/196 A

(58) Field of Classification Search .................. 210/232, 210/168, 188, 416.5, 428, 167.01, 167.02, 210/435, 436, 416.4, 445, 453, 454, 455, 210/462, 459, 172, 249, 473; 184/1.5, 106, 184/6.24; 123/196, 196 A
See application file for complete search history.

(56) References Cited

U.S. PATENT DOCUMENTS 1,671,391 A * 5/1928 Winslow et al. .............. 184/106
(Continued)

FOREIGN PATENT DOCUMENTS

DE 36 20 959 10/1987
(Continued)

OTHER PUBLICATIONS

Machine translation of DE 3620959, pp. 1.*
(Continued)

*Primary Examiner* — Tony G Soohoo
*Assistant Examiner* — David C Mellon
(74) *Attorney, Agent, or Firm* — Hamre, Schumann, Mueller & Larson, P.C.

(57) ABSTRACT

The present invention provides an oil pan with a built-in filtering element which does not easily receive influence of lateral swing of oil, which has high support rigidity of a filter, or which has excellent assembling operability of the filter, or which is light in weight as compared with a conventional oil pan. The oil pan P1 with a built-in filtering element has a filter 20. The filter 20 is provided therein with an oil flow path Q which is in communication with an oil pump. The filter 20 filters oil flowing toward the oil pump. An oil flow path includes a bottom flow path Qb having a flow path wall 7 extending along a bottom wall 5 of the oil pan, and a side flow path Qs having a flow path wall 8 extending along a first sidewall 1 of the oil pan. The first sidewall includes a drain hole 1*h* which opens at the bottom flow path and through which the filter can be inserted into the bottom flow path. The bottom flow path is provided with a filter retaining portion 7*k* which retains the inserted filter. The drain hole is provided with a plug fixing portion 1*m* which fixes a closing plug 10 of the drain hole. The closing plug is formed with a filter receiver 11*k* against which a terminal end 20*k* of the inserted filter is abutted.

4 Claims, 22 Drawing Sheets

U.S. PATENT DOCUMENTS

| | | | | |
|---|---|---|---|---|
| 1,759,447 | A | * | 5/1930 | Fisher ...................... 210/167.02 |
| 2,057,779 | A | * | 10/1936 | Jacobs ....................... 210/172.3 |
| 2,372,286 | A | * | 3/1945 | Mieras ...................... 210/167.09 |
| 2,447,144 | A | * | 8/1948 | Thornton ....................... 210/120 |
| 3,707,202 | A | * | 12/1972 | Dixon .......................... 184/6.24 |
| 3,749,248 | A | * | 7/1973 | Dickinson ..................... 210/238 |
| 4,459,208 | A | * | 7/1984 | Lemon ..................... 210/167.02 |
| 4,640,771 | A | * | 2/1987 | Whalen et al. ........... 210/167.01 |
| 4,930,469 | A | | 6/1990 | Kamprath et al. |
| 6,428,699 | B1 | * | 8/2002 | Iwata et al. ................... 210/249 |
| 6,517,710 | B2 | * | 2/2003 | Hartmann et al. ....... 210/167.02 |
| 6,584,950 | B1 | * | 7/2003 | Cunningham ............. 123/195 C |
| 6,616,836 | B1 | * | 9/2003 | Covington ............... 210/167.02 |
| 7,282,140 | B2 | * | 10/2007 | Boast et al. .................... 210/130 |
| 2002/0095763 | A1 | | 7/2002 | Willis et al. |
| 2002/0096221 | A1 | | 7/2002 | Kapcoe et al. |
| 2004/0007520 | A1 | | 1/2004 | Rosendahl et al. |
| 2004/0084250 | A1 | * | 5/2004 | Morii et al. ................... 184/106 |

FOREIGN PATENT DOCUMENTS

| | | |
|---|---|---|
| DE | 38 30 966 | 5/1989 |
| DE | 197 35 445 | 1/1999 |
| DE | 100 08 692 | 9/2001 |
| EP | 1 238 693 | 9/2002 |
| JP | 47-8267 | 3/1972 |
| JP | 54-53142 | 9/1977 |
| JP | 58-25604 | 8/1981 |
| JP | 57-53009 | 3/1982 |
| JP | 59-84210 | 6/1984 |
| JP | 60-86420 | 6/1985 |
| JP | 61-59809 | 4/1986 |
| JP | 10-311209 | 11/1988 |
| JP | 63-168010 | 11/1988 |
| JP | 1-108310 | 7/1989 |
| JP | 1-163516 | 11/1989 |
| JP | 1-174672 | 12/1989 |
| JP | 8-42319 | 2/1996 |
| JP | 3104544 | 4/1996 |
| JP | 9-53434 | 2/1997 |
| JP | 2002-364325 | 12/2002 |
| JP | 2004-132317 | 4/2004 |
| JP | 2004-150631 | 5/2004 |
| JP | 2005-48946 | 2/2005 |
| KR | 2003-52265 | 6/2003 |
| KR | 2004-0033274 | 4/2004 |
| WO | WO 03/064827 | 8/2003 |

OTHER PUBLICATIONS

Machine Translation of JP 2004-132317 A, pp. 1-6.*
Korean Office Action dated Jan. 30, 2007.

* cited by examiner

OIL PAN WITH BUILT-IN FILTERING ELEMENT

BACKGROUND OF THE INVENTION

1) Field of the Invention

The present invention relates to an oil pan provided in an oil circulatory system such as a mechanical apparatus or a power apparatus, and more particularly, to an oil pan with a built-in filtering element.

2) Description of the Related Art

Conventionally, in an oil circulatory system such as the mechanical apparatus and the power apparatus, there is a known oil pan for storing circulation oil therein is added to a lower portion of an apparatus which uses oil. For example, the oil pan is added to a lower portion of an engine or a transmission of a vehicle such as an automobile, oil in the oil pan is pumped up using an oil pump, the oil is supplied to the engine or transmission, and oil used by the engine or transmission is collected into the oil pan and is circulated.

In such an oil circulatory system, a filtering element such as an oil filter (simply "filter", hereinafter) which filters circulation oil is usually provided upstream from the oil pump.

For example, Japanese Patent Application Laid-open No. H8-42319 (prior art 1, hereinafter) discloses a structure in which such a filter is disposed in the oil pan. According to this conventional structure, a closing plug for closing a drain hole through which oil remaining in the oil pan is discharged at the time of maintenance is devised, and a filter is held in the oil pan using the closing plug. Further, Japanese Patent Application Laid-open No. 2002-364325 (prior art 2, hereinafter) discloses a structure in which a filter is disposed in the oil pan. According to this conventional structure, a baffle plate disposed in the oil pan comprises main plate and sub-plate made of synthetic resin, a passenger-shaped strainer chamber is formed between both the plates, and a mesh plate sandwiched between the main plate and sub-plate is disposed in the strainer chamber.

Since the filter is embedded in the oil pan, the oil circulatory system can be simplified.

According to the structure of the prior art 1, however, the filter is held in the oil in a state where the filter largely projects from a tip end of the closing plug, and when vibration or the like is applied to the oil pan and the oil laterally swings with respect to the filter, the filter largely receives influence of lateral swing of the oil, and since the filter is supported only at its one end and supporting rigidity is insufficient and thus, the filter is prone to receive influence of vibration input.

Further, there is a problem that the structure of the closing plug is complicated and the assembling operability of the filter is poor.

According to the structure of the prior art 2, the filter is held by the baffle plate having a large area mounted on an upper portion of the oil pan. Therefore, especially when vibration or the like is applied to the oil pan, the filter is prone to receive influence of the vibration, and if the input vibration is large, the filter may be damaged in some cases. When the position of an oil pump is changed, the shape or the like of the baffle plate (especially shape of the main plate) must be changed, and there is a problem that the design of the baffle plate must largely be changed.

Further, there is a problem that the oil pan has large volume as a part which is added to a lower portion of an apparatus which uses oil such as an engine and a transmission, and since the conventional oil pan is made of metal, its weight is increased.

SUMMARY OF THE INVENTION

The present invention has been achieved in view of the above-described technical problem, and it is an object of the invention to provide an oil pan with a built-in filtering element which is less subject to lateral swing of oil, supporting rigidity of the filter is high, or the assembling operability of the filter is excellent, and to provide an oil pan with a built-in filtering element which is less prone to receive influence of vibration input to the oil pan or freedom degree of design with respect to position change of the oil pump, and to provide an oil pan with a built-in filtering element which is lighter than that of the conventional oil pan.

To this end, a first invention of this application provides an oil pan with a built-in filtering element having an oil flow path which is in communication with an oil pump and a filtering element for filtering oil flowing toward the oil pump, wherein the oil flow path includes a bottom flow path having a flow path wall extending along a bottom wall of the oil pan and a side flow path having a flow path wall extending along a sidewall of the oil pan, the sidewall has a drain hole which is opened at the bottom flow path and through which the filtering element can be inserted into the bottom flow path, the bottom flow path is provided with a filtering element retaining portion which retains the filtering element inserted from the drain hole, the drain hole is provided with a plug fixing portion for fixing a closing plug which closes the drain hole, the dosing plug is formed with a filtering element receiver against which a terminal end of the filtering element inserted into the bottom flow path is abutted.

According to this structure, the filtering element can be inserted into the bottom flow path of the oil flow path (i.e., inside of the flow path wall of the bottom flow path) from the drain hole, the inserted filtering element is retained to the filtering element retaining portion of the bottom flow path, and the terminal end of the filtering element can be abutted against the filtering element receiver of the closing plug. With this, the filtering element is held in the bottom flow path of the oil flow path (i.e., inside of the flow path wall of the bottom flow path). Therefore, even when vibration or the like is applied to the oil pan and oil swings laterally with respect to the filtering element, the filtering element does not easily receive influence of the lateral swing of oil, and the filtering element is stably held in the flow path wall of the bottom flow path.

When the filtering element is assembled in the oil pan, the filtering element is inserted into the bottom flow path from the drain hole, one end of the filtering element is retained to the filtering element retaining portion, the closing plug is fixed to the plug fixing portion and the other end of the filtering element is abutted against the plug fixing portion. Therefore, the filtering element can be assembled in the oil pan with simple operation as compared with the conventional technique.

In another embodiment of the application, the filtering element retaining portion retains one end of the filtering element, and the other end of the filtering element is abutted against the filtering element receiver.

With this structure, one end of the filtering element is retained to the filtering element retaining portion in the bottom flow path of the oil flow path, and the terminal end of the filtering element is abutted against the filtering element receiver of the closing plug. In this state, the filter is held in the oil pan. With this, both ends thereof are stably held in the bottom flow path, and high support rigidity can be obtained as compared with the conventional technique.

According to another embodiment of the application, a side of the filtering element is formed with a projection which extends substantially along an insertion direction of the filtering element and has a predetermined width, an inner surface of a sidewall of the bottom flow path is formed with a fitting groove into which the projection is fitted when the filtering element is inserted.

With this structure, the filtering element is held in a state where the projection which extends substantially along the insertion direction formed on the side thereof and has the predetermined width is fitted to the fitting groove provided in the inner surface of the sidewall of the bottom flow path. Thus, the support rigidity in the bottom flow path can further be enhanced. The projection is fitted to the fitting groove. Therefore, when the filtering element is inserted, the filtering element is guided along the insertion direction, and the assembling operability into the bottom flow path is further enhanced. The filtering element is held in a state where the projection on the side of the filtering element is fitted into the fitting groove formed in the inner surface of the sidewall of the bottom flow path. With this, a case in which oil does not pass through the filtering element and leaks toward downstream from between the side of the filtering element and the inner surface of the sidewall of the bottom flow path can effectively be avoided.

According to another embodiment of the application, the filtering element comprises a first filtering element located relatively upstream side from the oil flow path and a second filtering element located downstream from the first filtering element, a mesh of the second filtering element is set finer than that of the first filtering element.

According to this structure, foreign matters such as dust or cuttings having relatively large size are prevented from flowing toward downstream by the first filtering element having rougher mesh element located relatively upstream of the oil flow path. With this, it is possible to effectively prevent the second filtering element having smaller mesh than the first filtering element which is located downstream from becoming clogged early.

A second invention of the application provides an oil pan with a built-in filtering element having an oil flow path which is in communication with an oil pump and a filtering element for filtering oil flowing toward the oil pump, wherein the oil pan includes a hollow cover member which is provided at its upper surface with an oil pipe connected to the oil pump side and which has a lower surface fixed to a predetermined portion of a bottom wall of the oil pan, a filtering element disposed at a predetermined location of the cover member upstream from the oil pipe, and an opening which is provided upstream from the filtering element and through which oil flows into the hollow of the cover member, a recess having a predetermined shape which opens upward is formed in the predetermined portion of the bottom wall of the oil pan, a lower surface of the cover member is fixed to the bottom wall of the oil pan such that the lower surface extends astride the upper opening of the recess, a portion of the upper opening of the recess constitutes an opening through which oil flows into the hollow of the cover member.

According to this structure, the filtering element is disposed at a predetermined location upstream from the oil pipe of the hollow cover member which is provided at its upper surface with the oil pipe connected to the oil pump side, and the lower surface of the cover member is fixed to the predetermined portion of the oil pan on the side of the bottom wall. That is, the lower surface of the cover member having the filtering element is fixed to the oil pan on the side of the bottom wall. Therefore, even when vibration is input to the oil pan, the filtering element does not easily receive influence of the vibration as compared with the conventional technique, and it is possible to the oil pan from being damaged even when large vibration is input. Also when the position of the oil pump is changed, it is only necessary to change the position of the cover member having the filtering element on the oil pan bottom wall, and it is easy to handle such a case. That is, high freedom degree of design can be secured with respect to position change.

Especially, the lower surface of the cover member is fixed to the bottom wall of the oil pan such as to extend astride the upper opening of the recess formed at the predetermined portion of the bottom wall of the oil pan. Therefore, foreign matters such as metal dust or cuttings included in the oil can be deposited on the bottom of the recess-before the foreign matters reach the filtering element, and it is possible to effectively prevent the filtering element from becoming clogged. Since a portion of the upper opening of the recess constitutes the opening through which oil flows into the hollow of the cover member, it is unnecessary to take the trouble to provide the cover body with the opening, the structure of the cover body can be simplified and it is easily produce the cover body.

A third invention of the application provides an oil pan with a built-in filtering element having an oil flow path which is in communication with an oil pump and a filtering element for filtering oil flowing toward the oil pump, wherein the oil pan includes a hollow cover member which is provided at its upper surface with an oil pipe connected to the oil pump side and which has a lower surface fixed to a predetermined portion of a bottom wall of the oil pan, a filtering element disposed at a predetermined location of the cover member upstream from the oil pipe, and an opening which is provided upstream from the filtering element and through which oil flows into the hollow of the cover member, a cylindrical portion is formed at a predetermined portion of the bottom wall of the oil pan, the cylindrical portion is surrounded by a vertical wall provided integrally with the bottom wall and the cylindrical portion has an upper opening of a predetermined shape which opens upward, the filtering element and the cover member are disposed such as to cover the upper opening of the cylindrical portion.

According to this structure, the filtering element is disposed at a predetermined location upstream from the oil pipe of the hollow cover member which is provided at its upper surface with the oil pipe connected to the oil pump side, and the lower surface of the cover member is fixed to the predetermined portion of the oil pan on the side of the bottom wall. That is, the lower surface of the cover member having the filtering element is fixed to the oil pan on the side of the bottom wall. Therefore, even when vibration is input to the oil pan, the filtering element does not easily receive influence of the vibration as compared with the conventional technique, and it is possible to the oil pan from being damaged even when large vibration is input. Also when the position of the oil pump is changed, it is only necessary to change the position of the cover member having the filtering element on the oil pan bottom wall, and it is easy to handle such a case. That is, high freedom degree of design can be secured with respect to position change.

Especially, the cylindrical portion is formed on the predetermined portion of the bottom wall of the oil pan. The cylindrical portion is surrounded by the vertical wall which is integrally provided on the bottom wall. The cylindrical portion has an upper opening of a predetermined shape which upwardly opens. The filtering element and the cover member are disposed such as to cover the upper opening of the cylindrical portion. Therefore, foreign matters such as metal dust or cuttings included in the oil can be deposited on the bottom of the recess before the foreign matters reach the filtering element, and it is possible to effectively prevent the filtering element from becoming clogged.

A fourth invention of the application provides an oil pan with a built-in filtering element having an oil flow path which is in communication with an oil pump and a filtering element for filtering oil flowing toward the oil pump, wherein the oil pan includes a hollow cover member which is provided at its upper surface with an oil pipe connected to the oil pump side and which has a lower surface fixed to a predetermined portion of a bottom wall of the oil pan, a filtering element disposed at a predetermined location of the cover member upstream from the oil pipe, and an opening which is provided upstream from the filtering element and through which oil flows into the hollow of the cover member, the cover member is formed with the opening through which oil flows into the hollow of the cover member, the filtering element is integrally provided together with the cover member such as to cover the opening.

According to this structure, the filtering element is disposed at a predetermined location upstream from the oil pipe of the hollow cover member which is provided at its upper surface with the oil pipe connected to the oil pump side, and the lower surface of the cover member is fixed to the predetermined portion of the oil pan on the side of the bottom wall. That is, the lower surface of the cover member having the filtering element is fixed to the oil pan on the side of the bottom wall. Therefore, even when vibration is input to the oil pan, the filtering element does not easily receive influence of the vibration as compared with the conventional technique, and it is possible to the oil pan from being damaged even when large vibration is input. Also when the position of the oil pump is changed, it is only necessary to change the position of the cover member having the filtering element on the oil pan bottom wall, and it is easy to handle such a case. That is, high freedom degree of design can be secured with respect to position change.

Especially, the opening through which oil flows into the hollow of the cover member is formed in the cover member, and the filtering element is integrally provided on the cover member such as to cover the opening. Thus, it is unnecessary to handle the filtering element and the cover member as separate parts, and the number of parts can be reduced. Further, the fixing operation when the cover member is fixed to the oil pan on the side of the bottom wall is facilitated.

In each of the above structures, the oil pan is preferably made of synthetic resin. Since the oil pan is made of synthetic resin, the oil pan which occupies large volume as a part to be added to a lower portion of an apparatus which uses oil can be reduced in weight. Thus, the entire apparatus having the oil circulatory system can be reduced in weight. Since the synthetic resin is applied, the oil flow path can easily integrally formed in the oil pan. When a recess or a cylindrical portion is provided on the side of the bottom wall of the oil pan, it can easily integrally formed.

DESCRIPTION OF THE PREFERRED EMBODIMENTS

Embodiments of the present invention will be explained in detail with reference to the accompanying drawings based on an example in which the invention is applied to an oil pan added to an engine of an automobile.

First, a first embodiment will be explained.

Figure 1:
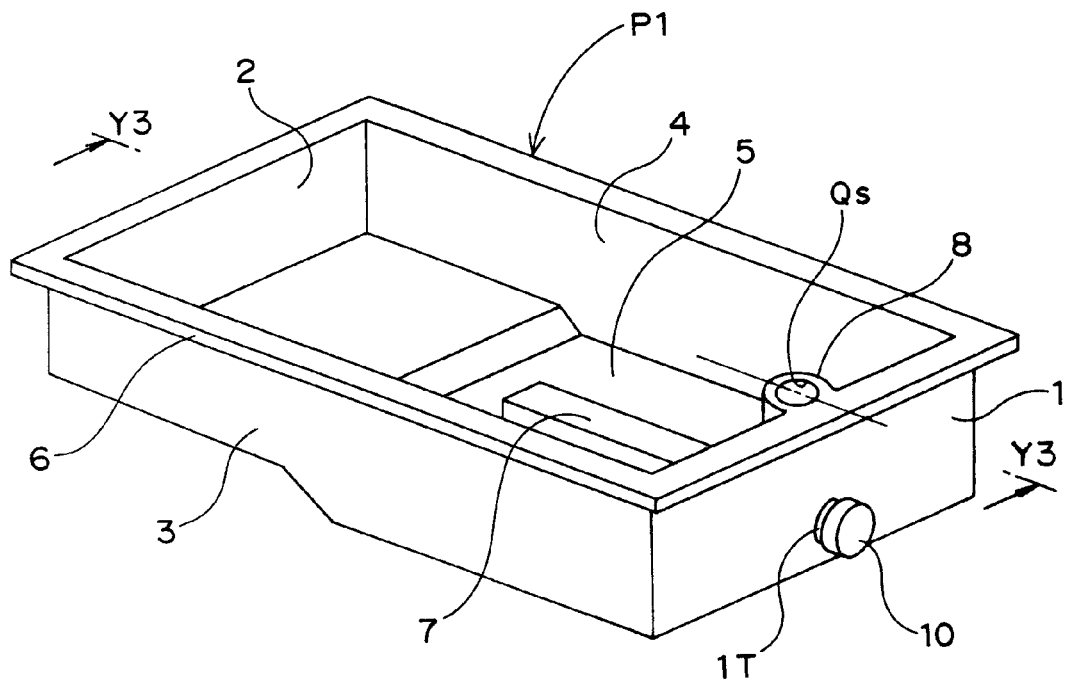
FIG. 1 is a perspective view showing an interior structure of an engine oil pan of an automobile according to a first embodiment of the present invention.
Figure 2:
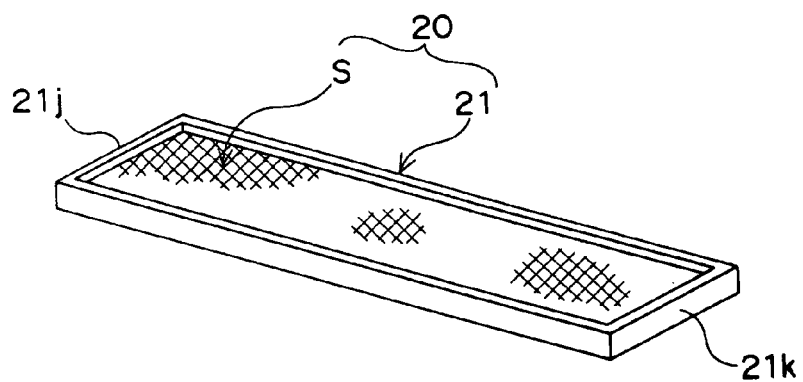
FIG. 2 is a perspective view of an oil filter embedded in the oil pan.
Figure 3:
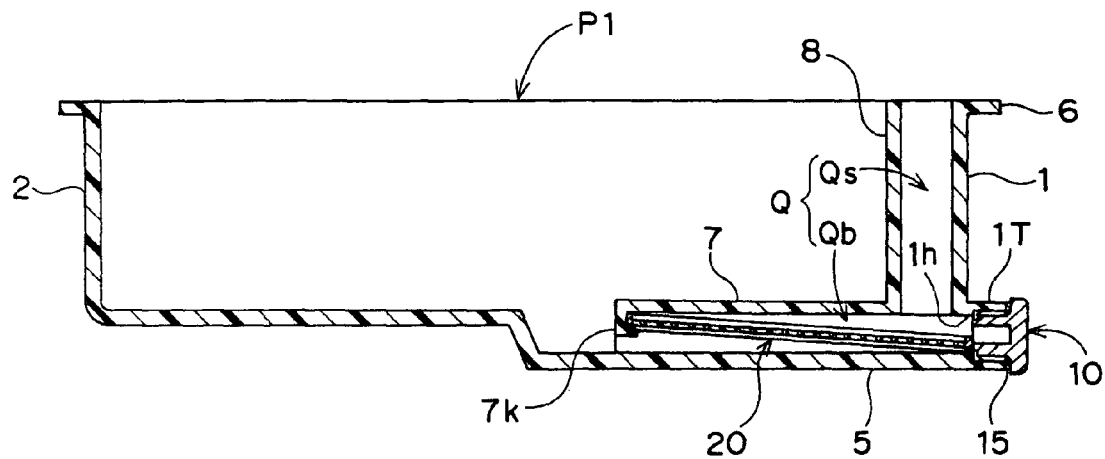
FIG. 3 is an explanatory sectional view of the oil pan taken along the line Y3-Y3 in FIG. 1.
Figure 4:
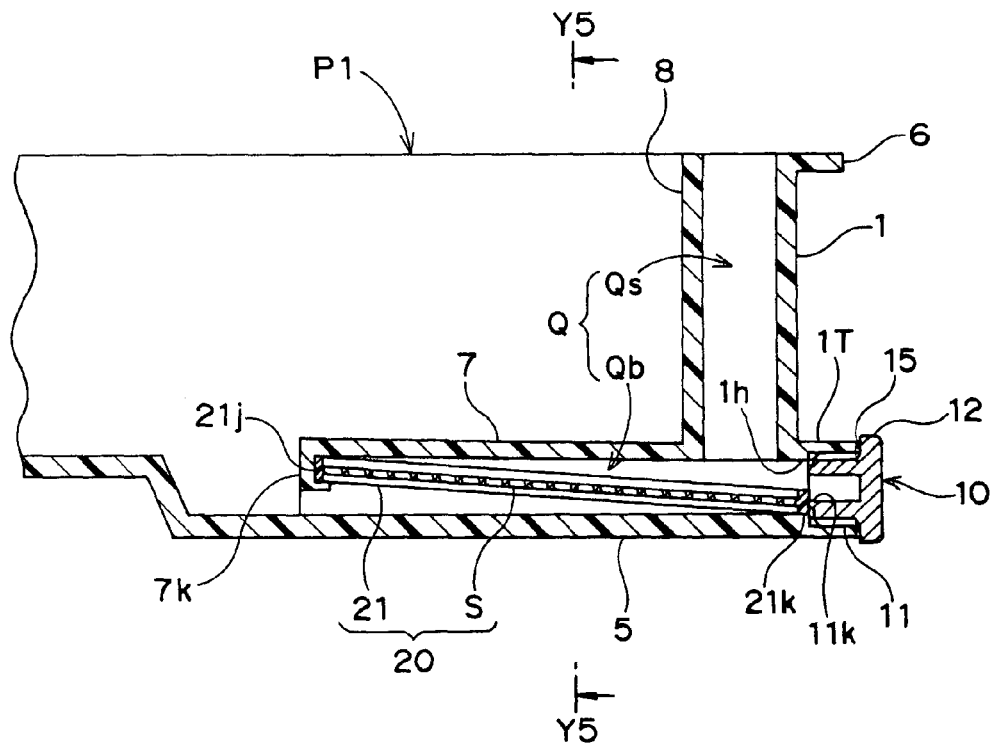
FIG. 4 is a partial explanatory sectional view of the oil pan in which an essential portion in FIG. 3 is enlarged.
Figure 5:
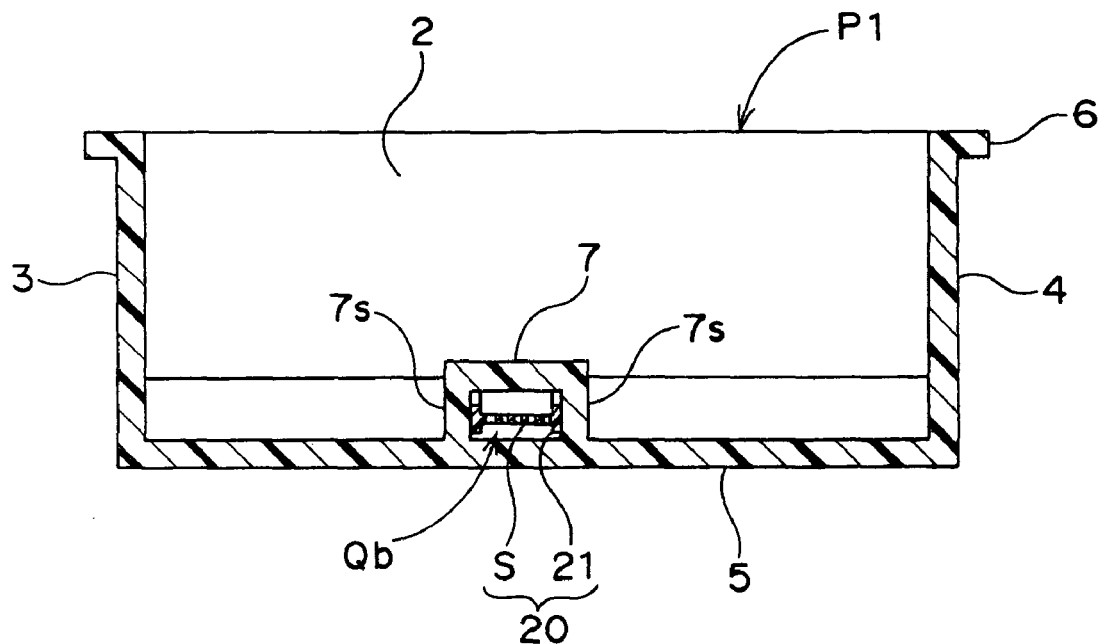
FIG. 5 is an explanatory sectional view of the oil pan taken along the line Y5-Y5 in FIG. 4.
Figure 6:
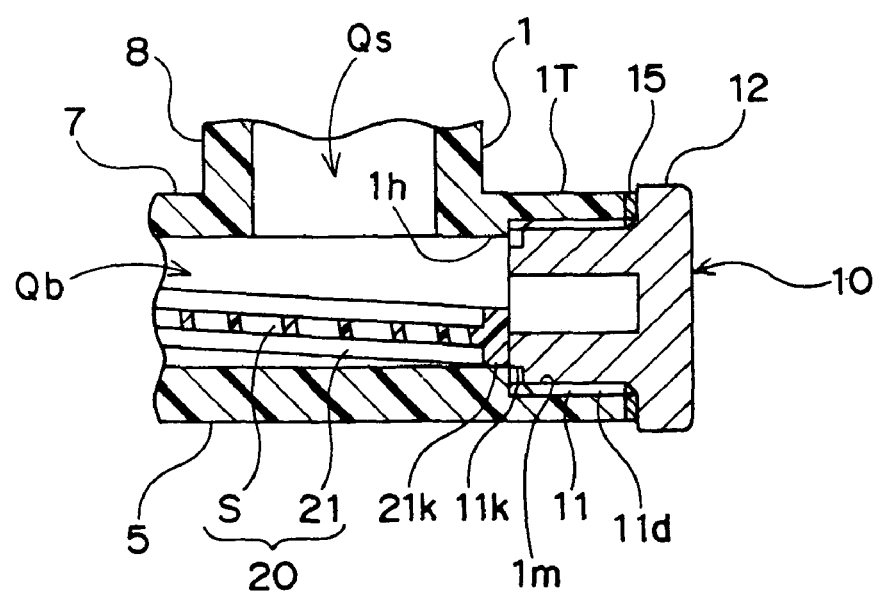
FIG. 6 is an enlarged explanatory sectional view of a fixed state of a closing plug of the oil pan.

FIG. 1 is a perspective view showing an interior structure of an engine oil pan of an automobile according to a first embodiment of the present invention. FIG. 2 is a perspective view of an oil filter embedded in the oil pan. FIG. 3 is an explanatory sectional view of the oil pan taken along the line Y3-Y3 in FIG. 1. FIG. 4 is a partial explanatory sectional view of the oil pan in which an essential portion in FIG. 3 is enlarged. FIG. 5 is an explanatory sectional view of the oil pan taken along the line Y5-Y5 in FIG. 4. FIG. 6 is an enlarged explanatory sectional view of a fixed state of a closing plug of the oil pan As can be seen in FIG. 1, an oil pan P1 according to the first embodiment is formed into a box-like shape which is opened upward. The oil pan P1 is of substantially rectangular shape as viewed from above. The oil pan P1 includes first and second sidewalls 1 and 2 which intersect with a longitudinal direction of the pan, and third and fourth sidewalls 3 and 4 disposed such as to connect both ends of the sidewalls 1 and 2 to each other. The oil pan P1 also includes a bottom wall 5 for connecting lower ends of the sidewalls 1 to 4 to each other. An upper end flange 6 is formed such as to connect upper ends of the sidewalls 1 to 4 to each other. The upper end flange 6 is used when the oil pan P1 is mounted on an engine (not shown).

Any one of the first and second sidewalls 1 and 2 (first sidewall 1 in this embodiment) is provided with a cylindrical projection 1T. The projection 1T is formed with a drain hole 1h (see FIGS. 3, 4 and 6) through which remaining oil in the oil pan P1 is discharged out at the time of maintenance or the like. The drain hole 1h is closed with a closing plug 10. The drain hole 1h is provided in the first sidewall 1 at a location as low as possible so that the remaining oil in the oil pan P1 can be discharged out as much as possible.

As shown in FIG. 6 in detail, the closing plug 10 includes a substantially cylindrical main body 11 and a substantially flat plate-like head 12. The main body 11 is formed at its outer periphery with a male screw 11d. The drain hole 1h is formed with a female screw 1m with which the male screw 11d of the closing plug 10 is threadedly engaged.

A previously selected seal member 15 (gasket) is interposed between a tip end of the projection 1T and the head 12 of the closing plug 10. In this state, the male screw 11d is threadedly engaged with the female screw 1m and fastened, the gasket 15 is liquid-tightly sealed between the tip end of the projection 1T and the head 12 of the closing plug 10 and in this state, the closing plug 10 is fastened and fixed to the drain hole 1h of the first sidewall 1.

As shown in FIGS. 3 and 4, an oil flow path Q which is in communication with an oil pump (not shown) of the engine is formed in the oil pan P1. The oil flow path Q includes a bottom flow path Qb extending along the bottom wall 5 and a side flow path Qs extending along the first sidewall 1.

The bottom flow path Qb includes a bottom wall 5, and a bottom flow path wall 7 integrally provided on an upper side of the bottom wall 5. The bottom flow path wall 7 is formed into a substantially rectangular parallelepiped box-like shape whose lower portion is opened. The flow path Qb having a rectangular cross section is formed by closing the lower opening with the bottom wall 5 as shown in FIG. 5.

The first sidewall 1 is integrally provided at its inner side with a tubular body 8 like a cylinder as a side flow path wall. With this the side flow path Qs is formed as an internal passage of the tubular body 8. When the oil pan P1 is mounted on the lower portion of the engine (not shown), an upper end of the side flow path Qs is brought into communication with the oil pump.

One end (upstream end) of the bottom flow path Qb is opened at a space in the oil pan P1, and the other end (downstream end) is opposed to the first sidewall 1 and is in communication with a lower end of the side flow path Qs. The drain hole 1h formed in the lower portion of the first sidewall 1 is opened at the other end of the bottom flow path Qb.

The oil pan P1 formed in the above-described manner is preferably produced by injection molding using predetermined synthetic resin.

If the oil pan P1 is made of synthetic resin in this manner, the oil pan P1 which occupies large volume as a part to be added to a lower portion of an engine can largely be reduced in weight as compared with the conventional metal oil pan, and the entire engine can be reduced in weight and thus, a vehicle can be reduced in weight. If the oil pan P1 is made of synthetic resin, it is possible to easily integrally form the oil flow path Q in the oil pan P1 (i.e., bottom flow path Qb and side flow path Qs).

In this embodiment, the oil flow path Q is provided at its intermediate portion (more specifically, bottom flow path Qb) with a filter 20 for filtering circulation oil. As shown in FIG. 2, the filter 20 includes a screen S formed into rectangular shape as viewed from above, and a frame 21 integrally surrounding a peripheral edge of the screen S.

The screen S is formed into a mesh-like shape having a predetermined number of meshes (the number of openings per unit area), and the screen S prevents dust and foreign matter (e.g., cuttings) having certain size or more from flowing toward the downstream.

More preferably, the filter 20 is formed as a compact comprising the frame 21 and screen S both made of synthetic resin, and both the frame 21 and the screen S are integrally formed. Alternatively, the frame 21 and the screen S may be formed separately and then, they may integrally be formed together by welding or adhesion, for example. Further, the screen S may be formed of metal such as metal mesh or porous plate, the metal screen S may be set in a synthetic resin mold of the frame 21, and the frame 21 and the screen S may integrally be formed by so-called insert molding.

The size of the frame 21 is set such that the filter 20 can be inserted into the bottom flow path Qb from the drain hole 1h.

As shown in FIGS. 3 and 4, the bottom flow path wall 7 is provided at its upper inner side of its upstream end with a groove-like filter retaining portion 7k which retains the filter 20 inserted from the drain hole 1h (more specifically one end 21j of the frame 21 in the longitudinal direction). The main body 11 of the closing plug 10 is formed at its tip end with an annular filter receiver 11k (see FIG. 6 for example) against which the other end 21k of the frame 21 in the longitudinal direction abuts.

In a state where the closing plug 10 is removed from the drain hole 1h, the filter 20 is inserted into the bottom flow path Qb from the drain hole 1h, the one end 21j of the frame 21 (upstream end) is fitted and retained to the filter retaining portion 7k of the bottom flow path wall 7. With this, the filter 20 is assembled in the bottom flow path Qb and in the projection 1T such that the filter 20 is inclined from the upstream side toward the downstream side downwardly. That is, the filter 20 is partitioned into the upstream side and downstream side concerning the bottom flow path Qb with the screen S. The closing plug 10 is fastened and fixed to the drain hole 1h of the first sidewall 1 as described above, so that the other end 21k (downstream end) of the frame 21 can be abutted against the filter receiver 11k of the closing plug 10.

At that time, in a state where there is almost no gap between the downstream end 21k of the frame 21 and the filter receiver 11k of the closing plug 10, the filter 20 is held between the filter retaining portion 7k and the filter receiver 11k. Alternatively, in a state where slight compression force is applied to the filter 20 in the longitudinal direction when the above-described gap is completely zero due to slight deflection of the filter 20 or fine compression of the gasket 15, the filter 20 is strongly held between the filter retaining portion 7k and the filter receiver 11k.

At that time, as shown in FIG. 5; the size of the side outer surface of the frame 21 of the filter 20 is set such that a gap between the side outer surface and an inner surface of a sidewall 7s of the bottom flow path wall 7 becomes minimum in a range in which the inserting operation of the filter 20 is not hinder, and both of them come into tight contact with each other substantially.

Therefore, it is possible to effectively avoid a case in which oil does not pass through the screen S between the side outer surface of the filter 20 and the sidewall 7s of the bottom flow path wall 7 and leaks downstream.

According to the embodiment, the filter 20 can be inserted into the bottom flow path Qb of the oil flow path Q from the drain hole 1h, the inserted filter 20 ((upstream end) of the one end 21j of the frame 21) is retained to the filter retaining portion 7k of the bottom flow path Qb (of the bottom flow path wall 7), and the terminal end of the filter 20 (downstream end 21k of the frame 21) can abut against the filter receiver 11k of the closing plug. With this, the filter 20 is held in the bottom flow path Qb of the oil flow path Q (i.e., inside of the sidewall 7s of the bottom flow path wall 7 of the bottom flow path Qb). Thus, even when vibration or the like is applied to the oil pan P1 and oil swings laterally with respect to the filter 20, the filter 20 is less prone to receive influence of lateral swing of the oil, and the filter 20 is stably held inside of the sidewall 7s of the bottom flow path wall 7 of the bottom flow path Qb.

When the filter 20 is assembled in the oil pan P1, the filter 20 is inserted into the bottom flow path Qb from the drain hole 1h, one end side 21j of the filter 20 is retained to the filter retaining portion 7k, the closing plug 10 is fixed to the drain hole 1h and the other end side 21k of the filter 20 is abutted against the filter receiver 11k. Thus, it is possible to assemble the filter 20 in the oil pan P1 with simple operation as compared with the conventional structures.

Especially in this case, the one end side 21j (upstream side) of the inserted filter 20 is retained to the filter retaining portion 7k of the bottom flow path Qb, and the other end side 21k (other end side) of the filter 20 can abut against the filter receiver 11k of the closing plug 10. That is, the filter 20 is held in the state that the upstream side 21j of the filter 20 is retained to the filter retaining portion 7k in the bottom flow path Qb of the oil flow path Q, and the downstream side 21k of the filter 20 abuts against the filter receiver 11k of the closing plug 10. In this state, the filter 20 is held in the bottom flow path Qb.

With this, at least the opposite ends 21j and 21k of the frame 21 of the filter 20 are stably held in the bottom flow path Qb, and high support rigidity can be obtained as compared with the conventional structures.

A second embodiment of the invention will be explained with reference to FIGS. 7 to 10.

In the following explanation, elements of the second embodiment having the same structures and same effects as those of the first embodiment will be designated with the same symbols and further explanation thereof will be omitted.

Figure 7:
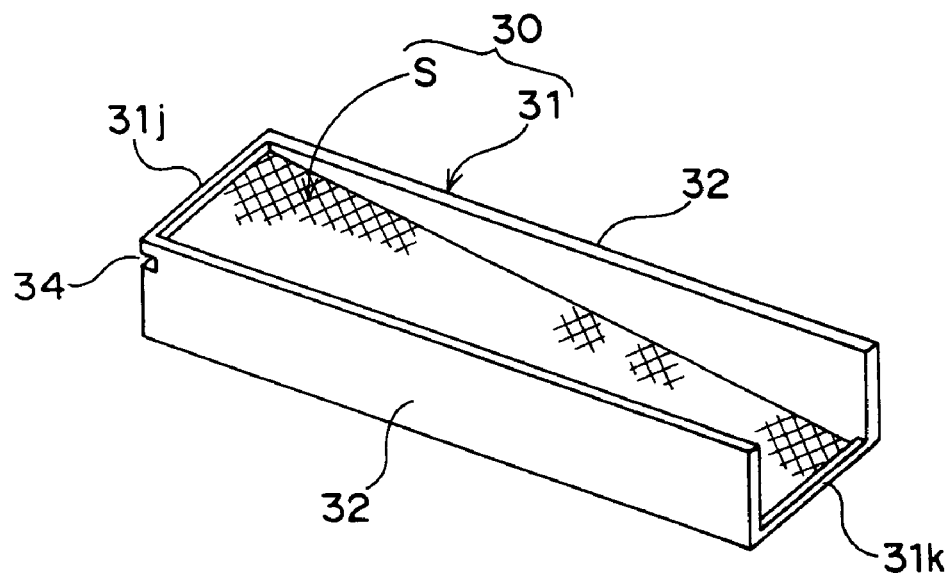
FIG. 7 is a perspective view of an entire filter according to a second embodiment of the invention.
Figure 8:
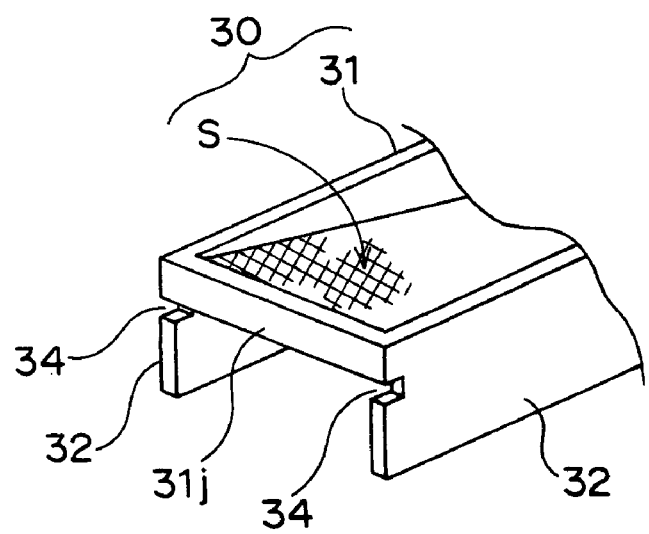
FIG. 8 is an enlarged perspective view of an essential portion of the filter of the second embodiment.
Figure 9:
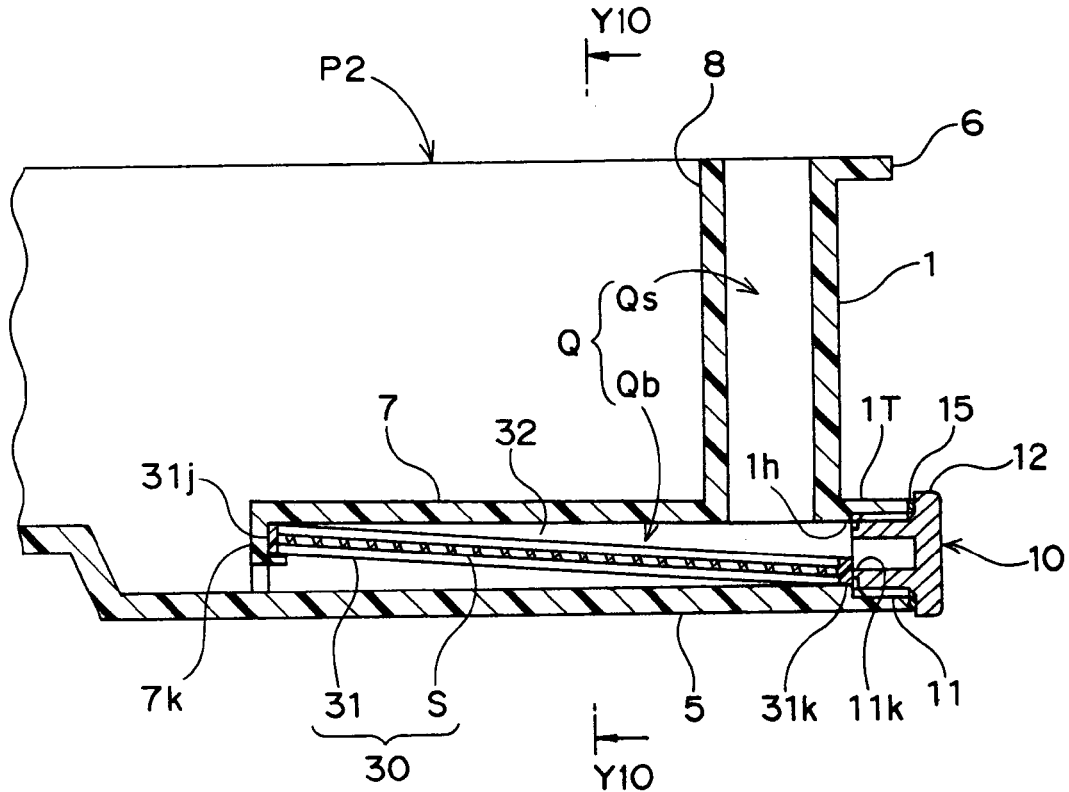
FIG. 9 is an explanatory sectional view of an essential portion of the oil pan according to the second embodiment which corresponds to FIG. 4.
Figure 10:
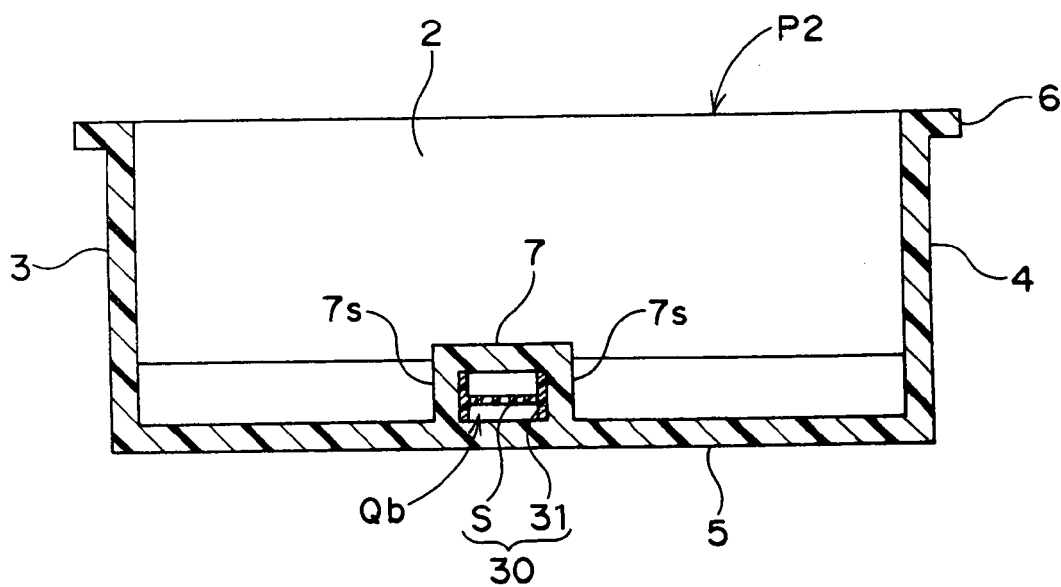
FIG. 10 is an explanatory sectional view of the oil pan taken along the line Y10-Y10 in FIG. 9.

FIG. 7 is a perspective view of an entire filter according to a second embodiment of the invention. FIG. 8 is an enlarged perspective view of an essential portion of the filter of the second embodiment. FIG. 9 is an explanatory sectional view of an essential portion of the oil pan according to the second embodiment which corresponds to FIG. 4. FIG. 10 is an explanatory sectional view of the oil pan taken along the line Y10-Y10 in FIG. 9.

According to a filter 30 of the second embodiment, frame portions of an upstream end 31j and a downstream end 31k of a frame 31 are the same as those of the first embodiment, but the filter 30 includes a pair of left and right vertical walls 32 as 1 frame portions. The screen S is inclined downward from upstream side to downstream side between both the vertical walls 32, and the screen S is integrally formed on the frame 31. Since the left and right portions of the frame 31 are the vertical walls, the rigidity of the frame 31 can be enhanced.

Each of the vertical walls 32 is formed into a rectangular shape as viewed from a side, and height thereof is set such that a difference between the height of the vertical wall 32 and a height of the bottom flow path Qb of the oil pan P2 becomes minimum in a range where the inserting operation of the filter 30 from the drain hole 1h is not hindered.

With this, the filter 30 is stably held in the bottom flow path Qb, the filter 30 is effectively prevented from rattling vertically, and influence of vibration input can further be reduced.

Each vertical wall 32 is provided at its upstream end with a notch 34. When the filter 30 is inserted into the bottom flow path Qb from the drain hole 1h and the one end 31j (upstream end) of the frame 31 is fitted and retained into the filter retaining portion 7k of the bottom flow path wall 7, the notch 34 avoids interference between the filter retaining portion 7k and the vertical wall 32.

Like the first embodiment, the downstream end 31k of the frame 31 is abutted against the filter receiver 11k of the closing plug 10 and in this state, the filter 30 is held in the bottom flow path Qb.

In the second embodiment also, as shown in FIG. 10, the size of the side outer surface of the frame 31 of the filter 30 is set such that a gap between the side outer surface and an inner surface of a sidewall 7s of the bottom flow path wall 7 becomes minimum in a range in which the inserting operation of the filter 30 is not hinder, and both of them come into tight contact with each other substantially.

Therefore, it is possible to effectively avoid a case in which oil does not pass through the screen S between the side outer surface of the filter 30 and the sidewall 7s of the bottom flow path wall 7 and leaks downstream.

The second embodiment can obtain the same effects as those of the first embodiment. Further, since the left and right portions of the frame 31 of the filter 30 are the vertical walls, the rigidity of the frame 31 can further be enhanced, and the filter 30 can be held in the bottom flow path Qb more stably.

Figure 12:
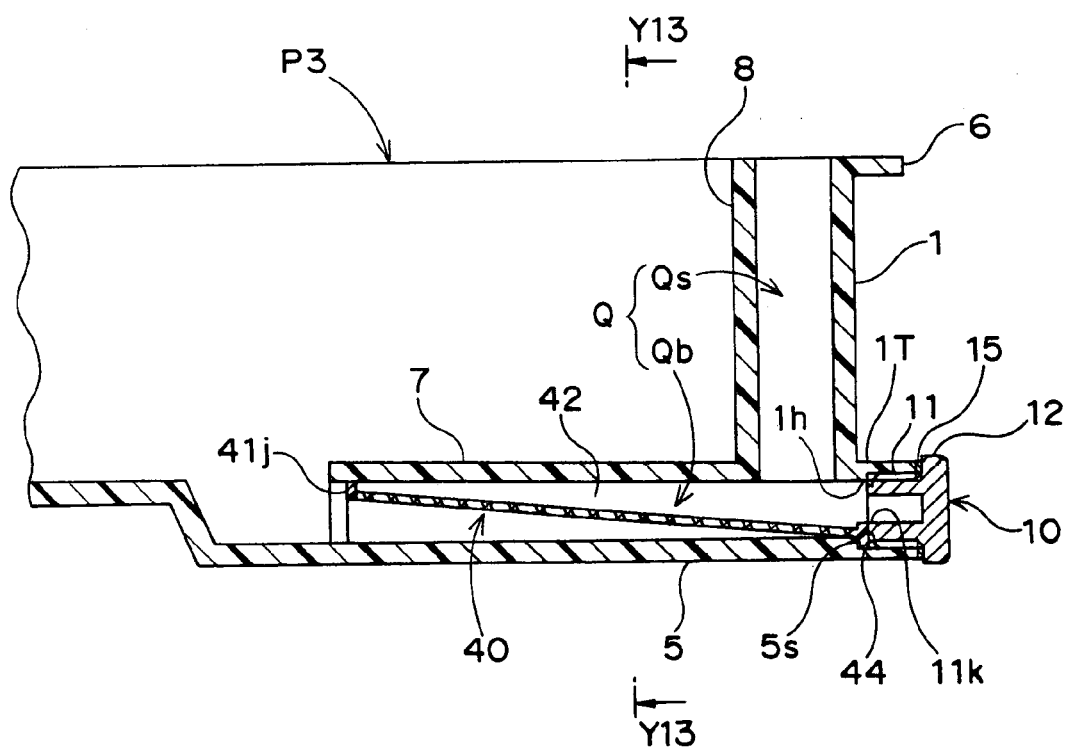
FIG. 12 is an explanatory sectional view of an essential portion of the oil pan of the third embodiment corresponding to FIG. 4.
Figure 13:
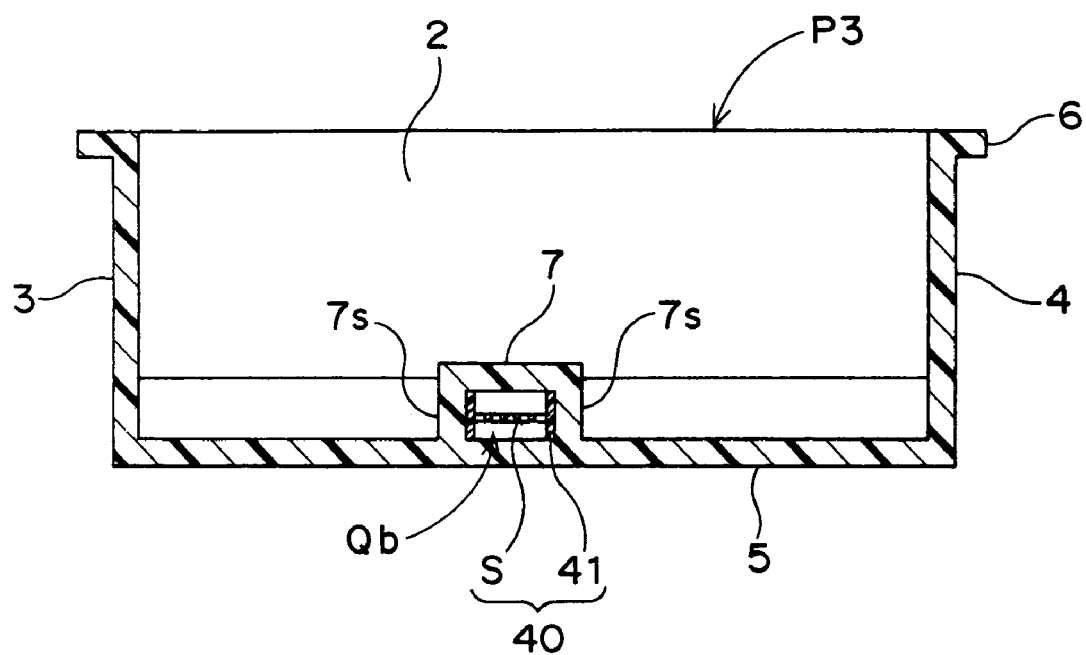
FIG. 13 is an explanatory sectional view of the oil pan taken along the line Y13-Y13 in FIG. 12.

Next, a third embodiment of the invention will be explained with reference to FIGS. 11 to 13.

Figure 11:
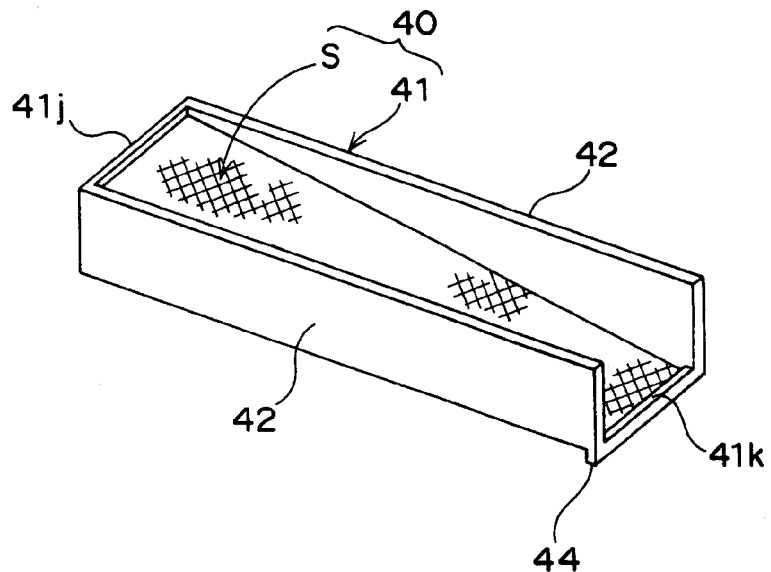
FIG. 11 is a perspective view of an entire filter according to a third embodiment of the invention.

FIG. 11 is a perspective view of an entire filter according to a third embodiment of the invention. FIG. 12 is an explanatory sectional view of an essential portion of the oil pan of the third embodiment corresponding to FIG. 4. FIG. 13 is an explanatory sectional view of the oil pan taken along the line Y13-Y13 in FIG. 12.

A filter 40 according to the third embodiment is similar to the filter 30 of the second embodiment, but the upstream end of each of vertical wall 42 of a frame 41 is not provided with a notch, and a filter retaining portion for retaining an upstream end 41j of the frame 41 is not provided on the upper inner side of the upstream end of the bottom flow path wall 7.

Instead, a convex portion 44 projecting downward by a predetermined amount is formed on a downstream end 41k of the frame 41 over its entire width. A step 5s with which the convex portion 44 of the frame 41 is engaged is formed in the vicinity of a boundary (i.e., downstream end of the bottom flow path Qb) between a projection 1T of the first sidewall 1 of the bottom wall 5 and the step 5s.

In this embodiment, when the filter 40 is assembled in the oil pan P3, the filter 40 is inserted into the bottom flow path Qb from the drain hole 1h, thereby retaining the convex portion 44 of the frame 41 to the step 5S of the bottom wall 5. In this retaining state, by fixing the plug 10 to the drain hole 1h, the filter receiver 11k of the closing plug 10 can abut against the downstream end of the filter 40. At that time, lower end surfaces of the left and right vertical walls 42 of the frame 41 are stably supported by an upper surface of the bottom wall 5.

In this case, when the filter 40 is inserted into the bottom flow path Qb from the drain hole 1h, the convex portion 44 of the frame 41 is retained to the step 5s of the bottom wall 5 on a relatively shallow side as viewed from an insertion side. Therefore, the filter 40 can be assembled in the oil pan P3 with a simpler operation.

The filter 40 is held in the bottom flow path Qb of the oil flow path Q (i.e., inner side of the sidewall 7s of the bottom flow path wall 7 of the bottom flow path Qb). With this, the same effect as that of the previous embodiment can be obtained.

Further, as in the same manner as that of the second embodiment, the left and right portions of the frame 41 of the filter 40 are the vertical walls. Thus, the rigidity of the frame 41 can further be enhanced, and since the lower end surface of the left and right vertical walls 42 of the frame 41 are supported by the upper surface of the bottom wall 5, the filter 40 can stably be held in the bottom flow path Qb.

Next, a fourth embodiment of the present invention will be explained with reference to FIGS. 14 to 16.

Figure 14:
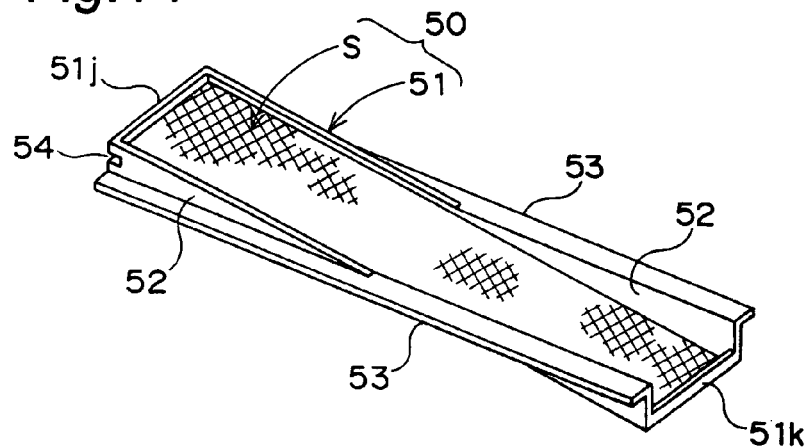
FIG. 14 is a perspective view of an entire filter according to a fourth embodiment of the invention.
Figure 15:
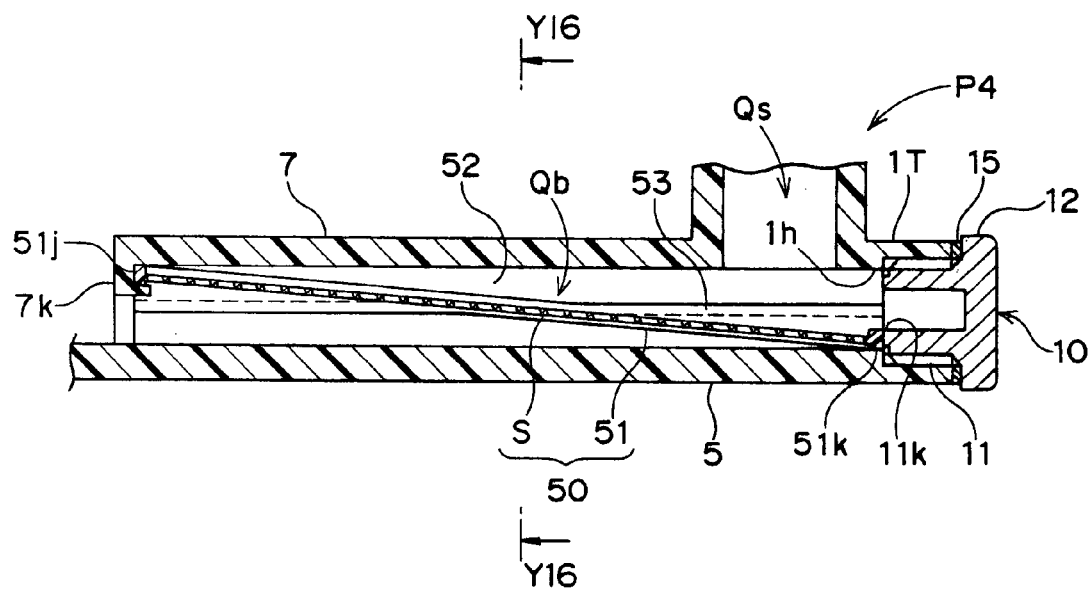
FIG. 15 is an explanatory sectional view of an essential portion of the oil pan according to the fourth embodiment which corresponds to FIG. 4.

FIG. 14 is a perspective view of an entire filter according to a fourth embodiment of the invention. FIG. 15 is an explanatory sectional view of an essential portion of the oil pan according to the fourth embodiment which corresponds to FIG. 4. FIG. 16 is an explanatory sectional view of the oil pan taken along the line Y16-Y16 in FIG. 15.

A filter 50 of the fourth embodiment is provided at its sidewalls 52 of the frame 51 with projections 53 having predetermined width and thickness. Each of the projections 53 extends substantially along the insertion direction of the frame 51. The projection 53 projects sideway. The upstream end of the sidewall 52 of the frame 51 is provided with a notch 54 that is the same as that of the second embodiment.

A screen S is integrally formed with the frame 51 in an attitude that the screen S is downwardly inclined from the upstream side to the downstream side between both the sidewalls 52. The left and right sidewalls 52 of the frame 51 are provided with the projections 53. With this, the rigidity of the frame 51 can be enhanced.

Figure 16:
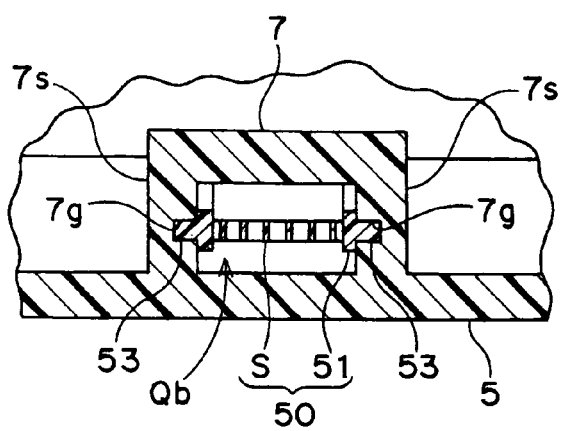
FIG. 16 is an explanatory sectional view of the oil pan taken along the line Y16-Y16 in FIG. 15.

As can be seen from FIG. 16, an inner surface of the sidewall 7s of the bottom flow path wall 7 of the bottom flow path Qb is provided with a fitting groove 7g to which the projection 53 is fitted when the frame 51 is inserted. Like the first and second embodiments, an upper inner side of the upstream end of the bottom flow path wall 7 is provided with a filter retaining portion 7k to which an upstream end 51j of the frame 51 is retained.

When the upstream end 51j of the frame 51 is fitted to the filter retaining portion 7k of the bottom flow path wall 7 and retained thereto, the notches 54 of the sidewalls 52 of the frame 51 prevent the filter retaining portion 7k and the sidewalls 52 from interfering with each other.

Like the first embodiment, a downstream end 51k of the frame 51 is abutted against the filter receiver 11k of the closing plug 10 and in this state, the filter 50 is held in the bottom flow path Qb.

In this embodiment also, as shown in FIG. 16, a size of an outer surface of the sidewall 52 of the frame 51 of the filter 50 is set such that a gap between the outer surface and an inner surface of the sidewall 7s of the bottom flow path wall 7 becomes minimum in a range where the inserting motion of the filter 50 is not hindered, and both of them come into intimate contact with each other. Thus, a case in which oil does not pass through the screen S between the side outer surface of the filter 30 and the inner surface of the sidewall 7s of the bottom flow path wall 7 and leaks toward the downstream is effectively avoided.

Further, the filter 50 is held in a state where the projection 53 of the sidewall 52 is fitted into the fitting groove 7g of an inner surface of the sidewall 7s of the bottom flow path Qb. With this, a case in which oil does not pass through the screen S between the sidewall 52 and the inner surface of the sidewall 7s of the bottom flow path Qb and leaks toward the downstream can be avoided more effectively.

In the forth embodiment, the filter 50 is held in the bottom flow path Qb of the oil flow path Q (i.e., inside of the sidewall 7s of the bottom flow path wall 7 of the bottom flow path Qb). With this, the same effect as those of the previous embodiments can be obtained. Further, the filter 50 is held in a state where the projection 53 having the predetermined width extending substantially along the insertion direction formed on the sidewall 52 of the frame 51 is fitted into the fitting groove 7g provided in the inner surface of the sidewall 7s of the bottom flow path Qb. Therefore, the supporting rigidity in the bottom flow path Qb can further be enhanced. Since the projection 53 is fitted into the fitting groove 7g, the filter 50 is guided along the insertion direction when the filter is inserted into the oil pan P4, and the assembling operability into the bottom flow path Qb is further enhanced.

Next, a fifth embodiment of the present invention will be explained with reference to FIGS. 17 and 18.

Figure 17:
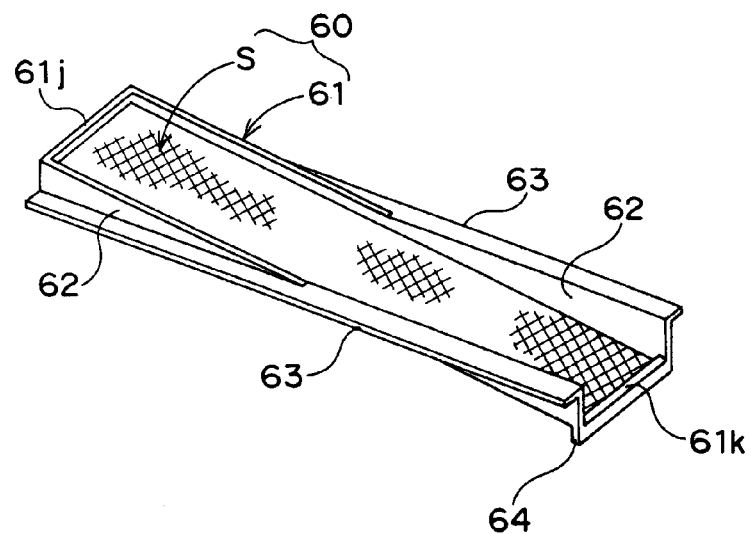
FIG. 17 is a perspective view of an entire filter according to a fifth embodiment of the invention.
Figure 18:
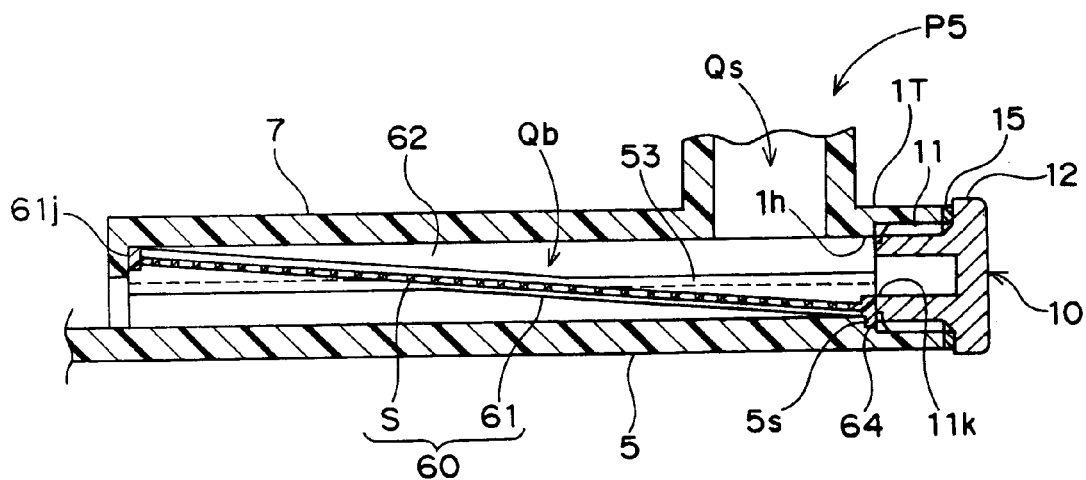
FIG. 18 is an explanatory sectional view of an essential portion of the oil pan according to the fifth embodiment which corresponds to FIG. 4.

FIG. 17 is a perspective view of an entire filter according to a fifth embodiment of the invention. FIG. 18 is an explanatory sectional view of an essential portion of the oil pan according to the fifth embodiment which corresponds to FIG. 4.

A filter 60 of the fifth embodiment is similar to the filter 50 of the fourth embodiment. Projections 63 having predetermined width and thickness project from sidewalls 62 of a frame 61. The projections 63 extend substantially along the insertion direction of the frame 61. The projections 63 project sideway. A screen S is inclined downward from an upstream side to a downstream side between both the sidewalls 62 and the screen S is integrally formed with the frame 61. The left and right sidewalls 62 of the frame 61 are provided with the projections 63 and thus, the rigidity of the frame 61 can be enhanced.

The upstream end of the sidewall 62 of the frame 61 is not provided with a notch, and a filter retaining portion for retaining an upstream end 61j of the frame 61 is not provided on the upper inner side of the upstream end of the bottom flow path wall 7.

Instead, like the third embodiment, a convex portion 63 projecting downward by a predetermined amount is formed on a downstream end 61k of the frame 61 over its entire width. A step 5s with which the convex portion 63 of the frame 61 is engaged is formed in the vicinity of a boundary (i.e., downstream end of the bottom flow path Qb) between a projection 1T of the first sidewall 1 of the bottom wall 5 and the step 5s. This structure is also the same as that of the third embodiment.

Although it is not illustrated concretely, the projections 63 provided on the left and right sidewalls 62 of the frame 61 have the same structures as those shown in FIG. 16 in the fourth embodiment, the projection 63 is fitted to the fitting groove 7g provided in the inner surface of the sidewall 7s of the bottom flow path Qb and in this fitting state, the filter 60 is held in the bottom flow path Qb.

In the fifth embodiment, like the third embodiment, when the filter 60 is assembled into the oil pan P5, the filter 60 is inserted into the bottom flow path Qb from the drain hole 1h. With this, a convex portion 64 of the frame 61 is retained to a step 5s of the bottom wall 5. In this retaining state, by fixing the plug 10 to the drain hole 1h, the filter receiver 11k of the closing plug 10 can be abutted against the downstream end of the filter 60.

Therefore, in this embodiment, the filter 60 is held in the bottom flow path Qb of the oil flow path Q (i.e., inside of the sidewall 7s of the bottom flow path wall 7 of the bottom flow path Qb). With this, the same effect as that of the previous embodiments can be obtained. The sidewall 62 of the frame 61 is provided with the projection 63, and the projection 63 is fitted into the fitting groove 7g provided in the inner surface of the bottom flow path sidewall 7s. With this, the same effect as that of the fourth embodiment can be obtained. The downstream end 61k of the frame 61 is provided with the convex portion 63 and the convex portion 63 is engaged with the step 5s of the bottom wall 5. With this, the same effect as that of the third embodiment can be obtained.

Next, a sixth embodiment of the present invention will be explained with reference to FIGS. 19 and 20.

Figure 19:
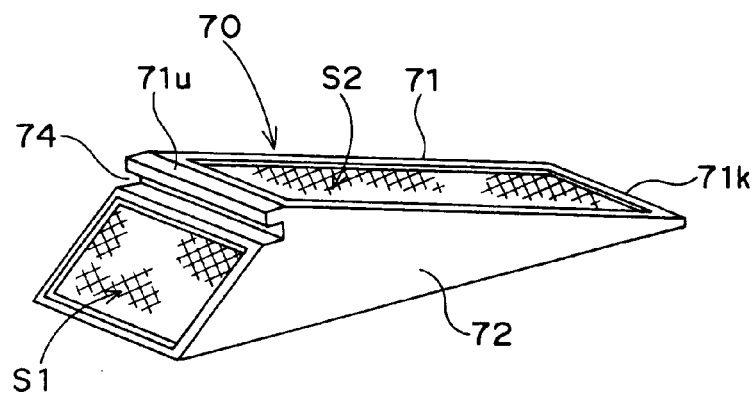
FIG. 19 is a perspective view of an entire filter according to a sixth embodiment of the invention.
Figure 20:
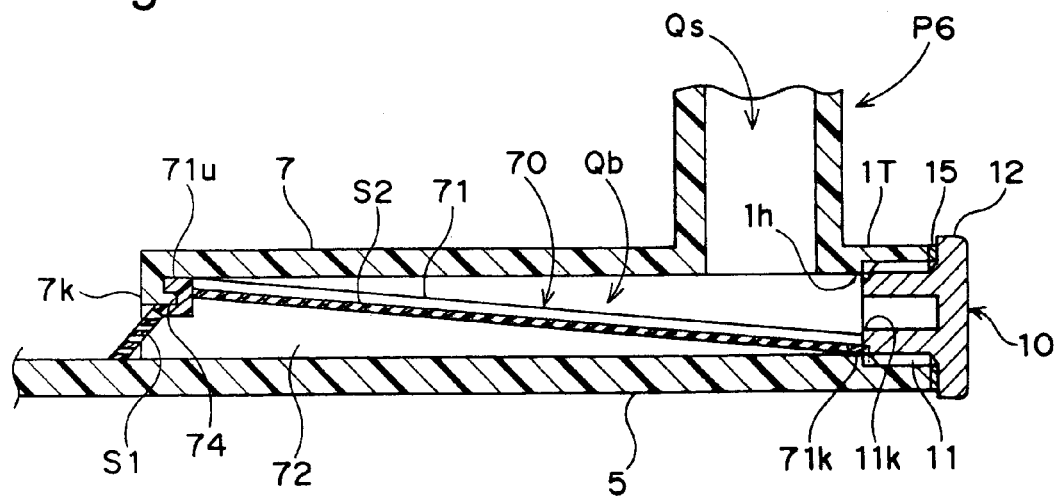
FIG. 20 is an explanatory sectional view of an essential portion of the oil pan according to the sixth embodiment which corresponds to FIG. 4.

FIG. 19 is a perspective view of an entire filter according to a sixth embodiment of the invention. FIG. 20 is an explanatory sectional view of an essential portion of the oil pan according to the sixth embodiment which corresponds to FIG. 4.

A filter 70 of the sixth embodiment includes a first screen S1 located upstream from the bottom flow path Qb of the oil flow path Q, and a second screen S2 located downstream from the first screen S1. Each of the sidewalls 72 of the frame 71 is of a substantially triangular shape as viewed from side, the first screen S1 is diagonally upwardly inclined toward the downstream. The second screen S2 is diagonally downwardly inclined toward the downstream. Both the screens S1 and S2 are integrally formed with the frame 71. The left and right sidewalls 72 of the frame 71 are vertical walls supported by the bottom wall 5 of the oil pan P6. With this, the rigidity of the frame 71 can be enhanced.

In the filter 70, the mesh of the second screen S2 is set finer than that of the first screen S1.

Therefore, it is possible to prevent dust or cuttings having relatively large size from flowing toward downstream by the first screen S1 having larger mesh located upstream of the oil flow path Q. With this, it is possible to effectively prevent the second screen S2 having smaller mesh than the first screen S1 which is located downstream from becoming clogged early.

A frame upper end 71u divides the screens S1 and S2. The frame upper end 71u is formed with a notch 74 over its entire width. An inner side of an upper portion of an upstream end of a bottom flow path wall 7 is provided with a filter retaining portion 7k for retaining the upper end 71u of the frame 71.

When the upper end 71u of the frame 71 is fitted to and retained to the filter retaining portion 7k of the bottom flow path wall 7, interference with respect to the filter retaining portion 7k is avoided by the notch 74 provided in the upper end 71u of the frame 71.

Like the first embodiment, the downstream end 71k of the frame 71 is abutted against the filter receiver 11k of the closing plug 10. In this state, the filter 70 is held in the bottom flow path Qb of the oil pan P6.

Although it is not illustrated concretely, in this embodiment also, a size of an outer surface of the sidewall 72 of the frame 71 of the filter 70 is set such that a gap between the outer surface and an inner surface of the sidewall 7s of the bottom flow path wall 7 becomes minimum in a range where the inserting motion of the filter 70 is not hindered, and both of them come into intimate contact with each other. Thus, a case in which oil does not pass through the screens S1 and S2 between the side outer surface of the filter 70 and the inner surface of the sidewall 7s of the bottom flow path wall 7 and leaks toward the downstream is effectively avoided.

In this sixth embodiment, most of the filter 70 is held in the bottom flow path Qb of the oil flow path Q (i.e., inside of the sidewall 7s of the bottom flow path wall 7 of the bottom flow path Qb). With this, the same effect as that of the previous embodiment can be obtained. Like the second embodiment, the left and right sidewalls 72 of the frame 71 of the filter 70 are the vertical walls and with this, the same effect as that of the second embodiment can be obtained.

As described above, the first screen S1 having relatively large mesh and the second screen S2 having relatively small mesh are provided. With this, it is possible to effectively prevent the second screen S2 having smaller mesh that located downstream from becoming clogged early.

Additionally, in this case, the first screen S1 is located such as to project from the filter retaining portion 7k provided on the upstream end of the bottom flow path wall 7 toward upstream, the filtering area is increased as a whole by the amount of this first screen S1, and higher oil filtering effect can be obtained.

Next, a seventh embodiment of the present invention will be explained with reference to FIGS. 21 to 23.

Figure 21:
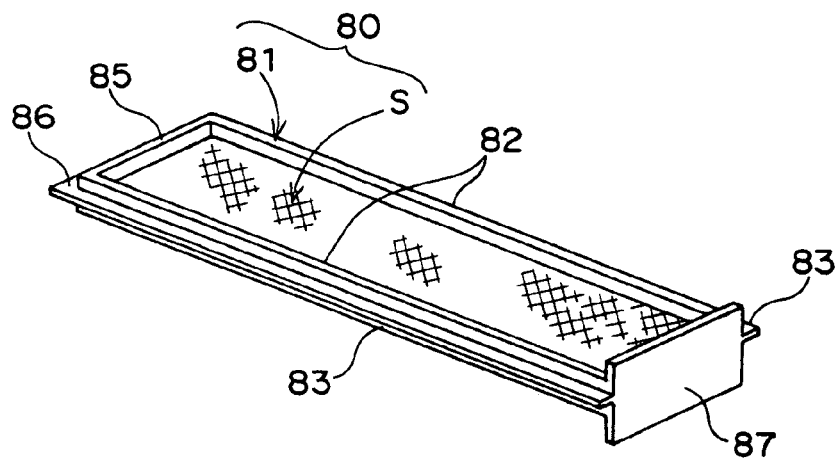
FIG. 21 is a perspective view of an entire filter according to a seventh embodiment of the invention.

FIG. 21 is a perspective view of an entire filter according to a seventh embodiment of the invention. FIG. 22 is an explanatory sectional view of an essential portion of the oil pan according to the seventh embodiment which corresponds to FIG. 4. FIG. 23 is an explanatory sectional view of the oil pan taken along the line Y23-Y23 in FIG. 22.

A filter 80 of the seventh embodiment includes left and right sidewalls 82 of a frame 81. A projection 83 having predetermined width and thickness projects from each of the left and right sidewalls 82 such as to extend substantially along the insertion direction of the frame 81. The projection 83 projects sideway. An upstream projection 86 is also formed on the upstream wall 85 of the frame 81 such as to be continuous with the projection 83. A downstream wall 87 which is fitted into the inner periphery of the bottom flow path Qb is integrally formed on the downstream end of the frame 81.

A screen S extends straightly without inclining from the upstream side toward the downstream side between the sidewalls 82 and in this state, the screen S is integrally formed on the frame 81. The projections 83 are provided on side surfaces of the left and right sidewalls 82 of the frame 81, and the upstream projection 86 is provided on the upstream wall 85 such that the upstream projection 86 is continuous with the side surface projection 83. With this, the rigidity of the frame 81 can be enhanced.

Figure 22:
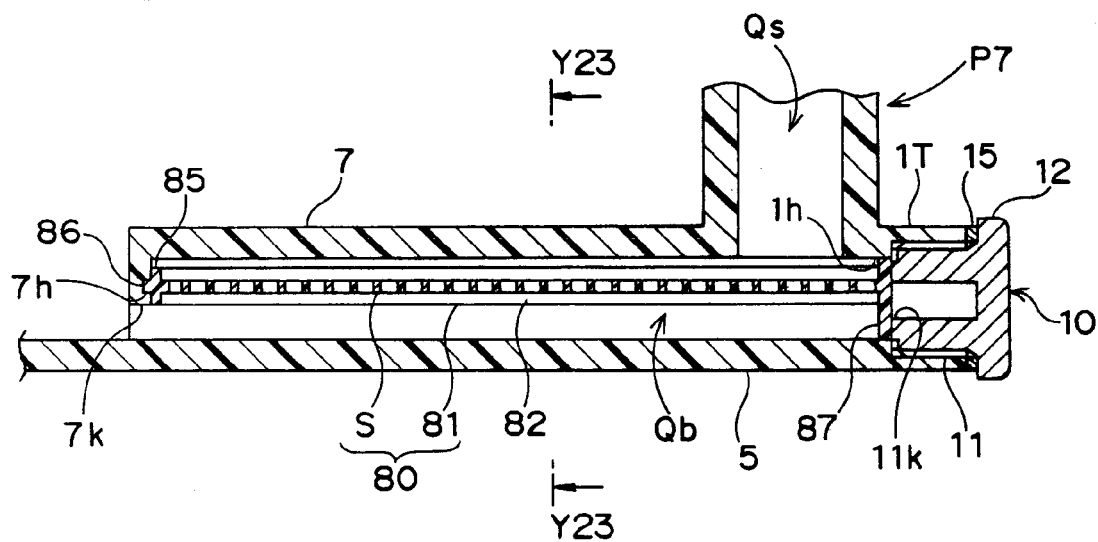
FIG. 22 is an explanatory sectional view of an essential portion of the oil pan according to the seventh embodiment which corresponds to FIG. 4.
Figure 23:
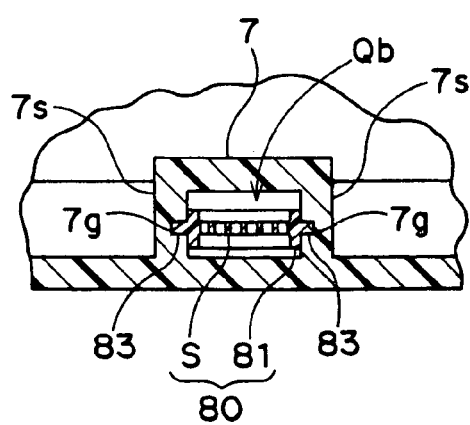
FIG. 23 is an explanatory sectional view of the oil pan taken along the line Y23-Y23 in FIG. 22.

As can be seen in FIGS. 22 and 23, the inner surface of the sidewall 7s of the flow path wall 7 of the bottom flow path Qb is provided with a side surface fitting groove 7g into which the side surface projection 83 is fitted when the frame 81 is inserted. An upper inner side of the upstream end of the bottom flow path wall 7 is provided with a filter retaining portion 7k. The filter retaining portion 7k is provided with an upstream fitting groove 7h into which the upstream projection 86 is fitted.

When the filter 80 is inserted into the bottom flow path Qb of the oil pan P7, the filter 80 is inserted while fitting the side surface projection 83 of the frame 81 into the side surface fitting groove 7g of the bottom flow path wall 7, the upstream projection 86 is fitted into the upstream fitting groove 7h of the bottom flow path wall 7 at the last stage of the inserting operation, and the filter 80 is assembled to the bottom flow path wall 7.

The downstream wall 87 of the frame 81 is abutted against the filter receiver 11k of the closing plug 10 and in this state, the filter 80 is held in the bottom flow path Qb.

In this embodiment also, as shown in FIG. 23, a size of an outer surface of the sidewall 82 of the frame 81 of the filter 80 is set such that a gap between the outer surface and an inner surface of the sidewall 7s of the bottom flow path wall 7 becomes minimum in a range where the inserting motion of the filter 80 is not hindered, and both of them come into intimate contact with each other. Thus, a case in which oil does not pass through the screens S1 and S2 between the side outer surface of the filter 80 and the inner surface of the sidewall 7s of the bottom flow path wall 7 and leaks toward the downstream is effectively avoided.

Further, the filter 80 is held in a state where the side surface projection 83 of the sidewall 82 of the frame and the upstream projection 86 are fitted to the side surface fitting groove 7g of the bottom flow path Qb and the upstream fitting groove 7h, respectively. With this, a case in which oil does not pass through the screen S and leaks toward the downstream side from between the frame sidewall 82, the upstream wall 85, the sidewall 7s of the bottom flow path Qb and the upper inner surface of the upstream end can further effectively avoided.

In the seventh embodiment, the filter 80 is held in the bottom flow path Qb of the oil flow path Q (i.e., inside of the sidewall 7s of the bottom flow path wall 7 of the bottom flow path Qb). With this, the same effect as that of the previous embodiment can be obtained. Further, the filter 80 is held in a state in which the side surface projection 83 having the predetermined width extending substantially along the insertion direction formed in the sidewall 82 of the frame 81 is fitted into the fitting groove 7g provided in the inner surface of the sidewall 7s of the bottom flow path Qb. Thus, the supporting rigidity in the bottom flow path Qb can further be enhanced. By fitting the side surface projection 83 into the fitting groove 7g, the filter 80 is guided along the insertion direction when the filter is inserted into the oil pan P7, and the assembling operability of the filter into the bottom flow path Qb is further enhanced.

Next, an eighth embodiment showing a basic conception and a structure of another embodiment of the invention will be explained.

Figure 24:
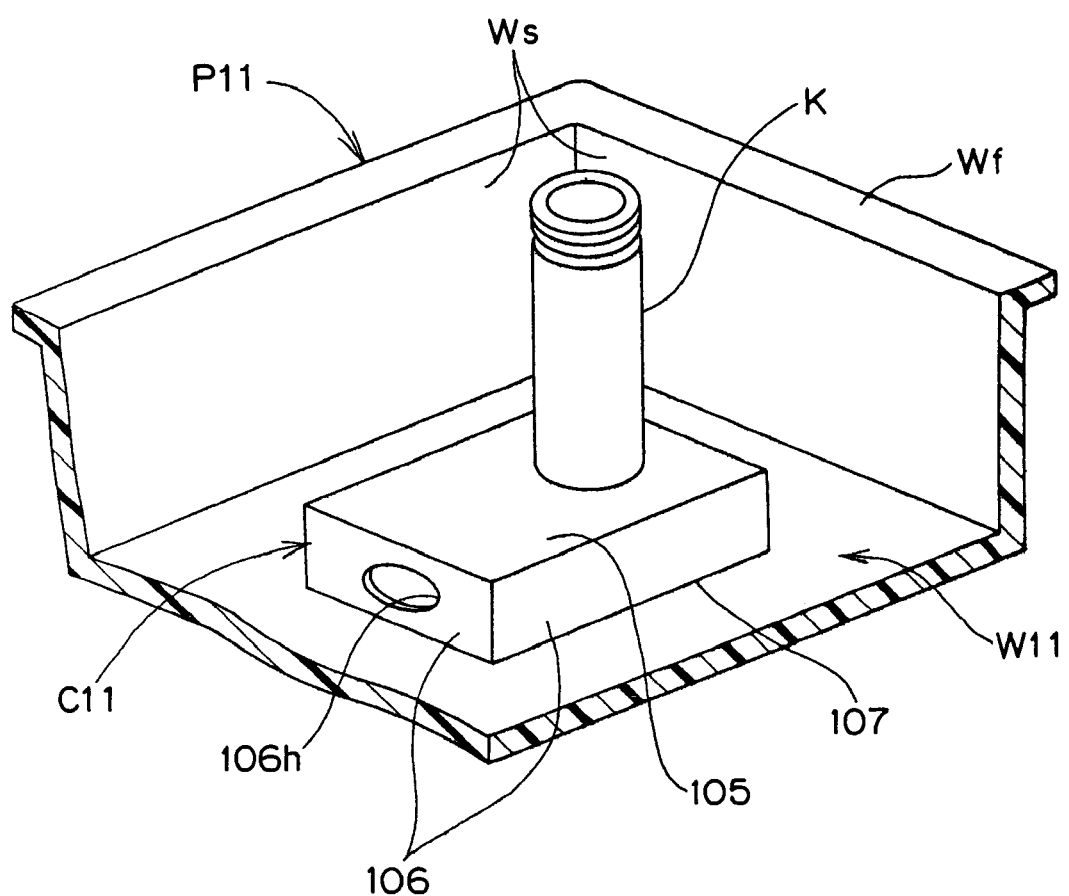
FIG. 24 is a partial perspective view showing an essential portion of an interior structure of an engine oil pan for an automobile according to an eighth embodiment of the invention.

FIG. 24 is a partial perspective view showing an essential portion of an interior structure of an engine oil pan for an automobile according to an eighth embodiment of the invention.

As shown in FIG. 24, this embodiment is set such that a substantially rectangular parallelepiped box-like hollow cover body C11 which is opened downward is disposed at a predetermined location of a bottom wall W11 of an oil pan P11, and an oil pipe K connected to an upstream pipe of an oil pump (not shown) of an engine (not shown) is integrally stood on an upper surface 105 of the hollow cover body C11. A position of the cover body C11 on the oil pan bottom wall W11 is set such that an upper end of the oil pipe K assumes a position suitable for connection to the oil pump. In FIG. 24, a symbol Ws represents a sidewall of the oil pan P11, a symbol Wf represents an upper end flange P11 provided such as to connect the upper ends of the sidewall and used when the oil pan Ws is mounted on an engine (not shown).

An opening 6h through which oil in the oil pan P11 flows into a hollow of the cover body C11 is formed at a location corresponding to a side surface of the cover body C11. Further, although it is not illustrated concretely, a filter (not shown) as a filtering element which filters oil flowing toward the oil pump is disposed at a predetermined location of the cover body C11 closer to the upstream than the oil pipe K. The opening 106h is located closer to the upstream than the filter. A lower surface of the cover body C11 is fixed to the predetermined location of the bottom wall W11 by vibration welding method for example. Various other known methods such as adhesion or thermal welding can also be used as this fixing method.

Preferably, the oil pan P11 is made of predetermined synthetic resin and produced by injection molding for example.

Since the oil pan P11 is made of synthetic resin in this manner, the oil pan P11 which occupies large volume as a part to be added to a lower portion of an engine can largely be reduced in weight as compared with the conventional metal oil pan, and the entire engine can be reduced in weight and thus, a vehicle can be reduced in weight.

Preferably, the cover body C11 is also made of predetermined synthetic resin and produced by injection molding for example.

Since the cover body C11 is made of synthetic resin in this manner, the upper surface 5 of the cover body C11 can easily be formed with the oil pipe K integrally. If a filter (not shown) disposed in the cover body C11 is integrally formed by insert molding for example, the cover body C11 having the oil pipe K and the filter (not shown) can be handed as one unit. That is, the number of parts can be reduced, the assembling step of the filter into the cover body C11 can be eliminated, and the productivity can be enhanced. In this case also, the cover body C11 can largely be reduced in weight as compared with a case in which metal material is used.

In the above-described structure, oil in the oil pan P11 flows into the hollow of the cover body C11 from the opening 6h and is filtered by the filter and the oil is sucked into an oil pump (not shown) though the oil pipe K. That is, the hollow of the cover body C11 opened sideway at the opening 6h and the oil pipe K constitute the oil flow path which is in communication with the oil pump.

In this embodiment, the filter (not shown) is disposed at a predetermined location upstream from the oil pipe K of the hollow cover member C11 which is provided at its upper surface 5 with the oil pipe K connected to the oil pump side, and a lower surface of the cover body C11 is fixed to a predetermined location of the oil pan bottom wall W11. That is, a lower surface 7 of the cover body C11 having the filter (not shown) is fixed to the oil pan P11 on the side of the bottom wall W11. Therefore, even if vibration is input to the oil pan P11, the filter is less prone to receive influence of the vibration as compared with the conventional technique, and an adverse possibility that the filter is damaged by large input vibration can be reduced.

When the position of the oil pump (not shown) is changed also, it is only necessary to change the position of the cover body C11 on the oil pan bottom wall W11, and it is extremely easy to handle the change in position as compared with the conventional technique. That is, high freedom degree of design can be secured with respect to the position change of the oil pump.

Next, a ninth embodiment of the present invention will be explained with reference to FIGS. 25 to 29.

In the following explanation, elements of the ninth embodiment having the same structures and same effects as those of the eighth embodiment will be designated with the same symbols and further explanation thereof will be omitted.

Figure 25:
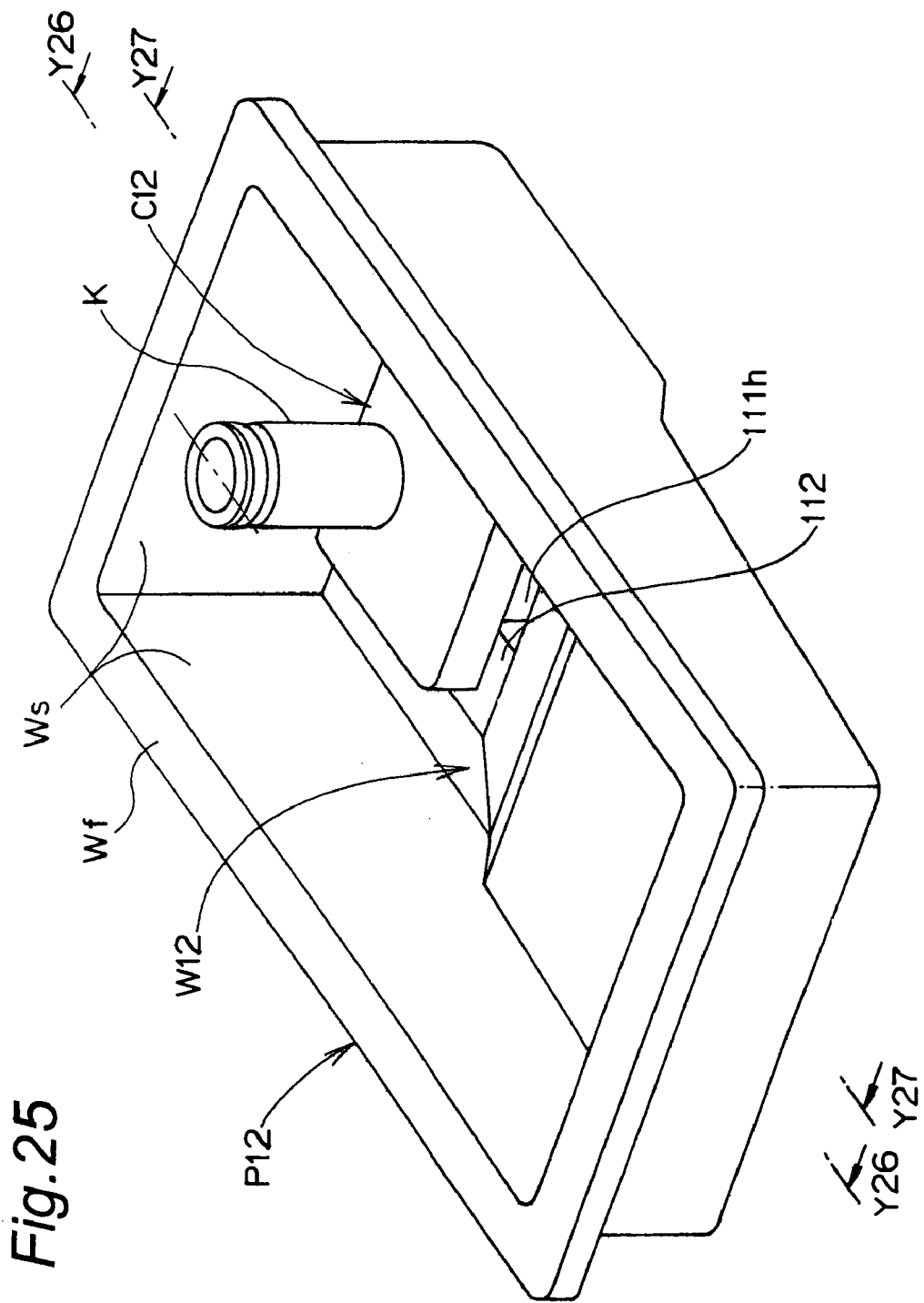
FIG. 25 is a perspective view of an entire oil pan according to a ninth embodiment of the invention.
Figure 26:
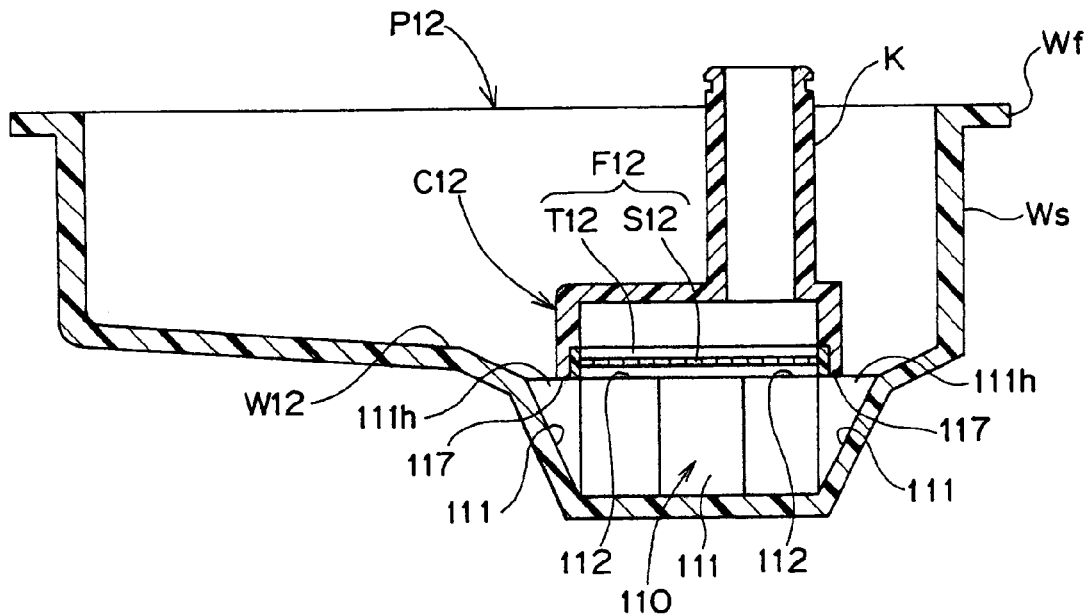
FIG. 26 is an explanatory sectional view of the oil pan taken along the line Y26-Y26 in FIG. 25.
Figure 27:
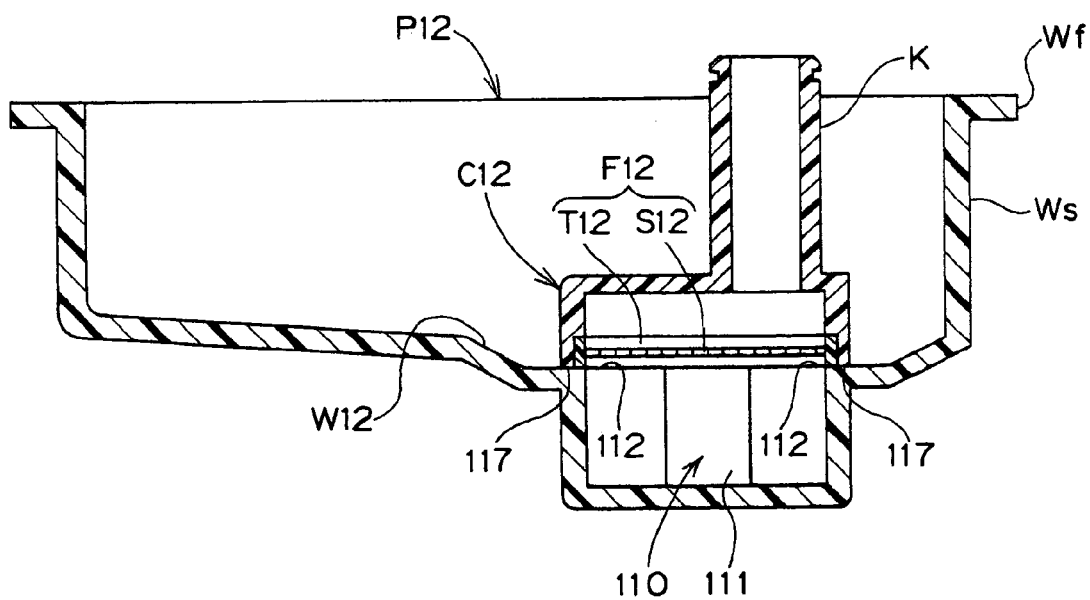
FIG. 27 is an explanatory sectional view of the oil pan taken along the line Y27-Y27 in FIG. 25.
Figure 28:
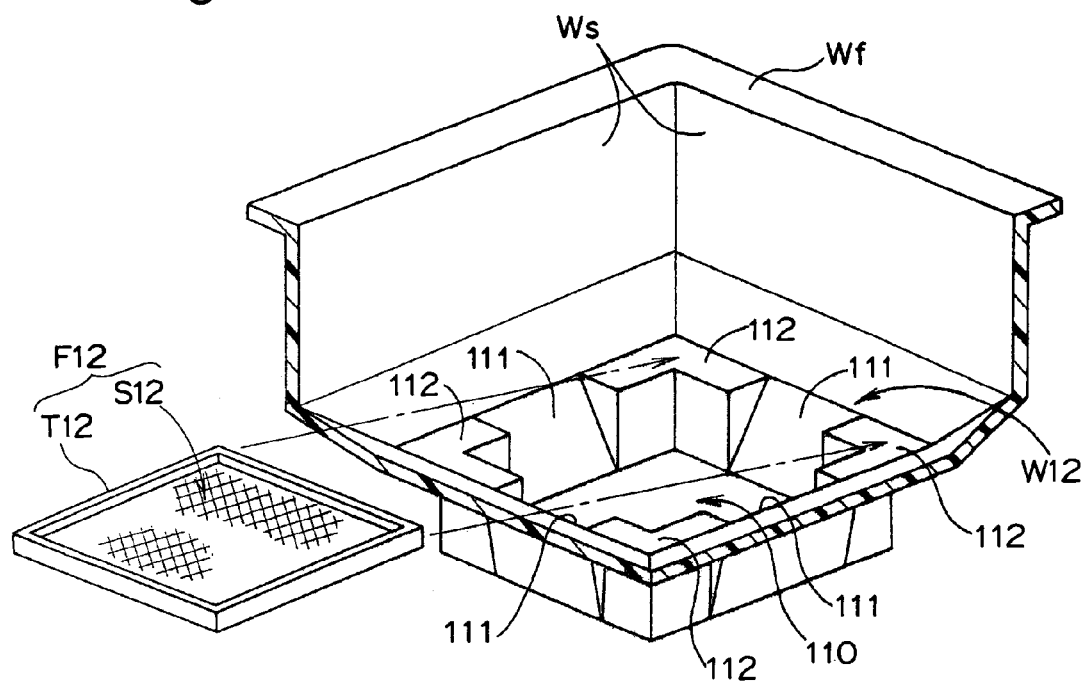
FIG. 28 is a partial perspective view of an essential portion of the interior structure of the oil pan according to the ninth embodiment.
Figure 29:
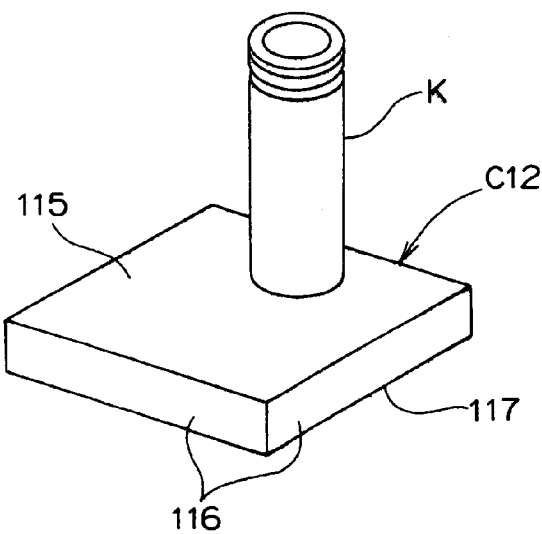
FIG. 29 is a perspective view of an entire cover body of the ninth embodiment.

FIG. 25 is a perspective view of an entire oil pan according to a ninth embodiment of the invention. FIG. 26 is an explanatory sectional view of the oil pan taken along the line Y26-Y26 in FIG. 25. FIG. 27 is an explanatory sectional view of the oil pan taken along the line Y27-Y27 in FIG. 25. FIG. 28 is a partial perspective view of an essential portion of the interior structure of the oil pan according to the ninth embodiment. FIG. 29 is a perspective view of an entire cover body of the ninth embodiment.

An oil pan P12 of the ninth embodiment is formed into a box-like shape which opens upward as a whole, and is formed into a substantially rectangular shape as viewed from above. The entire shape of the oil pan P12 is also the same as that of the oil pan P11 in the eighth embodiment.

A cover body C12 is fixed to a predetermined portion of the oil pan P12 at a location deviated toward one end thereof in the longitudinal direction on the bottom wall W12. As can be seen in FIGS. 26 to 28, a bottom wall W12 corresponding to the predetermined portion is formed with a recess 110 which opens upward and has a predetermined shape. As can be seen in FIG. 28, the recess 110 is formed into a substantially rectangular shape as viewed from above, inclined portions 111 which incline outward as approaching upper side are provided on substantially central portion of sides of the rectangular shape.

Therefore, in the upper end of the recess 110, only the inclined portions 111 outwardly project, and the recess 110 including the corners except the inclined portions 111 are formed with flat portions 112, respectively.

The recess 110 has a given depth. When oil flows into the recess 110, foreign matters such as metal dust and cuttings included in the oil can be deposited on the bottom of the recess 110.

As shown in FIG. 29, the cover body C12 of the embodiment has a shape similar to that of the eighth embodiment, and is formed into a rectangular parallelepiped box-like shape which is opened downward. The oil pipe K is integrally stood on an upper surface 115 of the cover body C12. A side surface 116 of the cover body C12 is not provided with an opening unlike the eighth embodiment.

A filter F12 shown in FIG. 28 is incorporated in the hollow of the cover body C12 as a filtering element for filtering circulation oil in the oil pan P12. The filter F12 comprises a screen S12 (screen) formed into a rectangular shape as viewed from above, and a frame T12 (frame) which integrally surround a peripheral edge of the screen S12.

The screen S12 is formed into a mesh-like shape having a predetermined number of meshes (the number of openings per unit area), and the screen S12 prevents dust and foreign matter (e.g., cuttings) having certain size or more from flowing toward the downstream.

More preferably, the filter F12 is formed as a compact comprising the frame T12 and the screen S12 both made of synthetic resin, and both the frame T12 and the screen S12 are integrally formed. Alternatively, they may be formed separately and then, they may integrally be formed together by welding or adhesion, for example. Further, the screen S12 may be formed of metal mesh or porous plate, the metal screen S12 may be set in a synthetic resin mold of the frame T12, and the frame T12 and the screen S12 may integrally be formed by so-called insert molding.

As shown in FIGS. 26 and 27, when the cover body C12 is fixed to the oil pan bottom wall W12, the filter F12 is incorporated in the lower end of the cover body C12, the four corners of the lower surface 17 of the cover body C12 are located on the upper surfaces of the flat portions 112 of the upper end of the recess 110 of the bottom wall W12, i.e., the lower surface 117 of the cover body C12 extend astride the upper opening of the recess 110, and the lower surface 117 of the cover body C12 is fixed to the upper surface of the flat portion 112. The same method as that of the eighth embodiment can be used as the fixing method.

Since the inclined portions 111 of the upper ends of the recess 110 outwardly project, an opening 111h is formed between the inclined portions 111 and the lower end of the cover body C12. Thus, oil can flows into the hollow of the cover body C12 from this opening 111h. That is, a portion of the upper opening of the recess 110 constitutes the opening 111h through which oil flows into the hollow of the cover body C12.

According to this embodiment, the same effect as that of the eighth embodiment can be obtained basically. Especially, the lower surface 117 of the cover body C12 is fixed to the bottom wall W12 of the oil pan P12 astride the upper opening of the recess 110 formed at the predetermined location of the bottom wall W12 of the oil pan P12. Therefore, foreign matters such as metal dust and cuttings included in the oil can be deposited on the bottom of the recess 110, and it is possible to effectively prevent the screen S12 of the filter F12 from becoming clogged.

Since a portion of the upper opening of the recess 110 constitutes the opening 111h through which oil flows into the hollow of the cover body C12, it is unnecessary to take the trouble to provide the cover body C12 with the opening, the structure of the cover body C12 can be simplified and it is easily produce the cover body C12.

In this embodiment also, the oil pan P12 and the cover body C12 are made of synthetic resin. If they are made of synthetic resin, the same effect as that of the eighth embodiment can be obtained. Especially since the oil pan P12 is made of synthetic resin, it is possible to easily form the bottom wall W12 of the oil pan P12 with a recess 110 having a complicated shape.

Next, a tenth embodiment of the present invention will be explained with reference to FIGS. 30 to 33.

Figure 30:
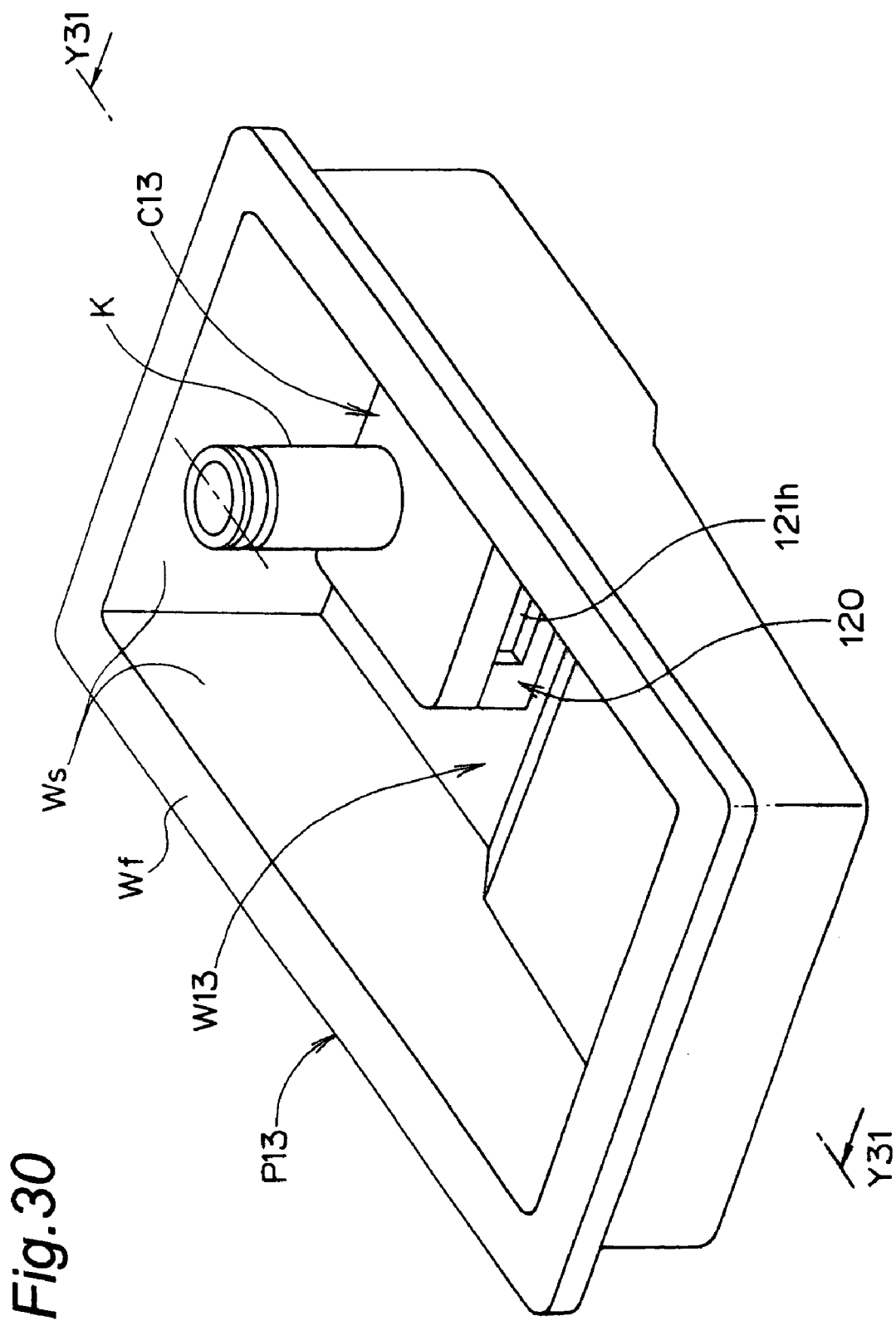
FIG. 30 is a perspective view of an entire oil pan according to a tenth embodiment of the invention.
Figure 31:
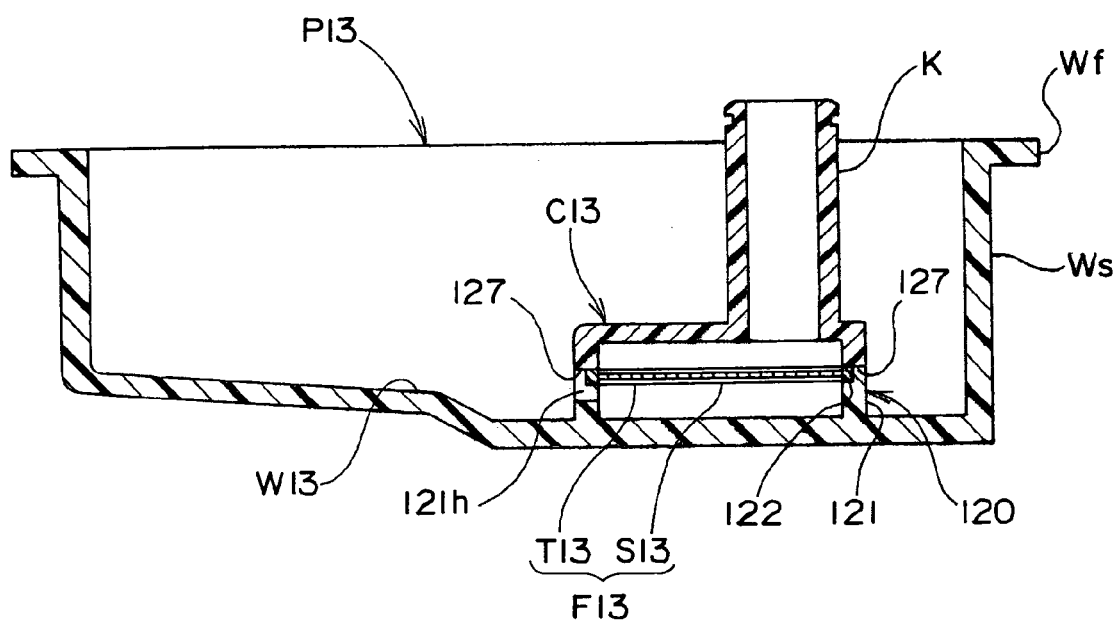
FIG. 31 is an explanatory sectional view of the oil pan taken along the line Y31-Y31 in FIG. 30.
Figure 32:
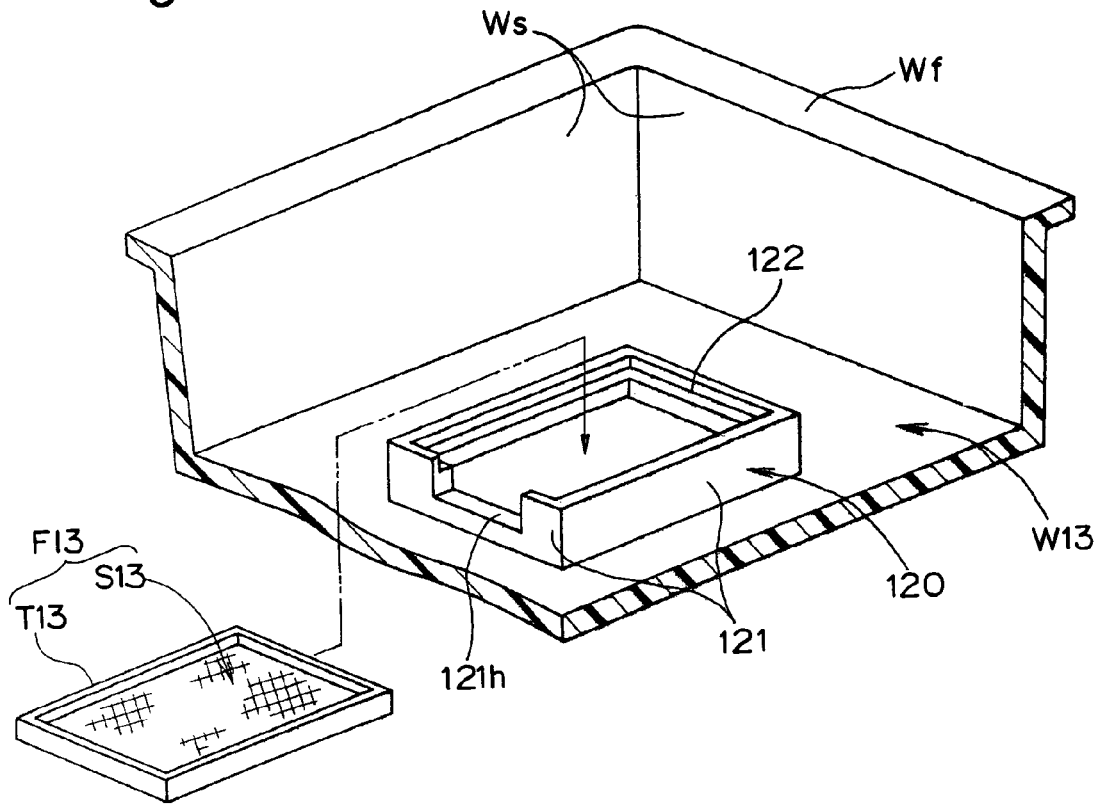
FIG. 32 is a partial perspective view showing an essential portion of an interior structure of an oil pan according to a tenth embodiment.
Figure 33:
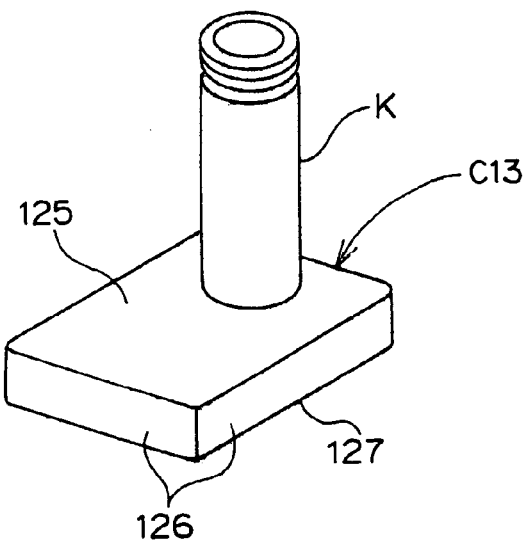
FIG. 33 is a perspective view of an entire cover body of the tenth embodiment.

FIG. 30 is a perspective view of an entire oil pan according to a tenth embodiment of the invention. FIG. 31 is an explanatory sectional view of the oil pan taken along the line Y31-Y31 in FIG. 30. FIG. 32 is a partial perspective view showing an essential portion of an interior structure of an oil pan according to a tenth embodiment. FIG. 33 is a perspective view of an entire cover body of the tenth embodiment.

According to the oil pan P13, a bottom wall W13 is integrally provided at its predetermined portion with a cylindrical portion 120 having predetermined height. The cylindrical portion 120 has a substantially rectangular opening which is surrounded by vertical walls 121, and is opened upwardly.

As shown in FIG. 33, a cover body C13 of this embodiment has a similar shape as that of the second embodiment. The cover body C13 is formed into substantially a rectangular parallelepiped box-like shape which is opened downwardly. An oil pipe K is integrally stood from an upper surface 25 of the cover body C13. The outward size of the cover body C13 as viewed from above is set to substantially the same as that of the cylindrical portion 120 as viewed from above. The side surface 126 of the cover body C13 is not provided with opening like the ninth embodiment.

As shown in FIG. 32, a filter F13 is assembled in a hollow of the cover body C13. The filter F13 comprises a screen S13 of rectangular shape as viewed from above, and a frame T13 which integrally surrounds a peripheral edge of the screen S13. This filter F13 has a shape similar to that of the ninth embodiment.

As can be seen in FIG. 32, at least one of the four vertical walls 121 of the cylindrical portion 120 is formed with a notch 121h having a predetermined depth. The notch is opened upwardly. A step 122 is formed on an inner side of the vertical wall 121 of the cylindrical portion 120. The filter F13 (i.e., frame T13) is fitted to the step 122 along the inner edge.

When the cover body C13 is fixed to the oil pan bottom wall W13, the filter F13 is fitted and assembled to the step 122 of the cylindrical portion 120 and in this state, the lower surface 27 of the cover body C13 is disposed and fixed such that the lower surface 27 is located on the upper surface of the vertical wall 121 of the cylindrical portion 120 and the upper surface of the frame T13 of the filter F13. As a fixing method, the same method as that of the eighth embodiment can be applied.

At that time, the upper side of the notch 121h of the vertical wall 121 is closed with the lower surface 127 of the cover body C13. With this, an opening 121h is formed between the vertical wall 121 and the side surface 126 of the cover body C13 through which oil flows into the hollow of the cover body C13.

As the assembling method of the filter F13, the filter F13 may be assembled in the cover body C13 like the filter F12 assembled in the cover body C12 (see FIGS. 26 and 27) in the ninth embodiment. In that case, it is unnecessary that the cylindrical portion 120 is provided at its upper surface with the step 122.

In this manner, the filter F13 and the cover body C13 are disposed such as to cover the upper opening of the cylindrical portion 120 of the oil pan bottom wall W13.

Therefore, according to this embodiment, the same effect as that of the eighth embodiment can be obtained basically. Further, foreign matters such as metal dust or cuttings included in oil can be deposited on the bottom of the cylindrical portion 120 before they reach the filter F13, and it is possible to effectively prevent the screen S13 of the filter F13 from becoming clogged.

In this embodiment also, the oil pan P13 and the cover body C13 are made of synthetic resin. If they are made of synthetic resin, the same effect as that of the eighth embodiment can be obtained. Especially since the oil pan P13 is made of synthetic resin, it is possible to easily form the bottom wall W13 of the oil pan P13 with a cylindrical portion 120 having a complicated shape.

Next, an eleventh embodiment of the present invention will be explained with reference to FIGS. 34 to 37.

Figure 34:
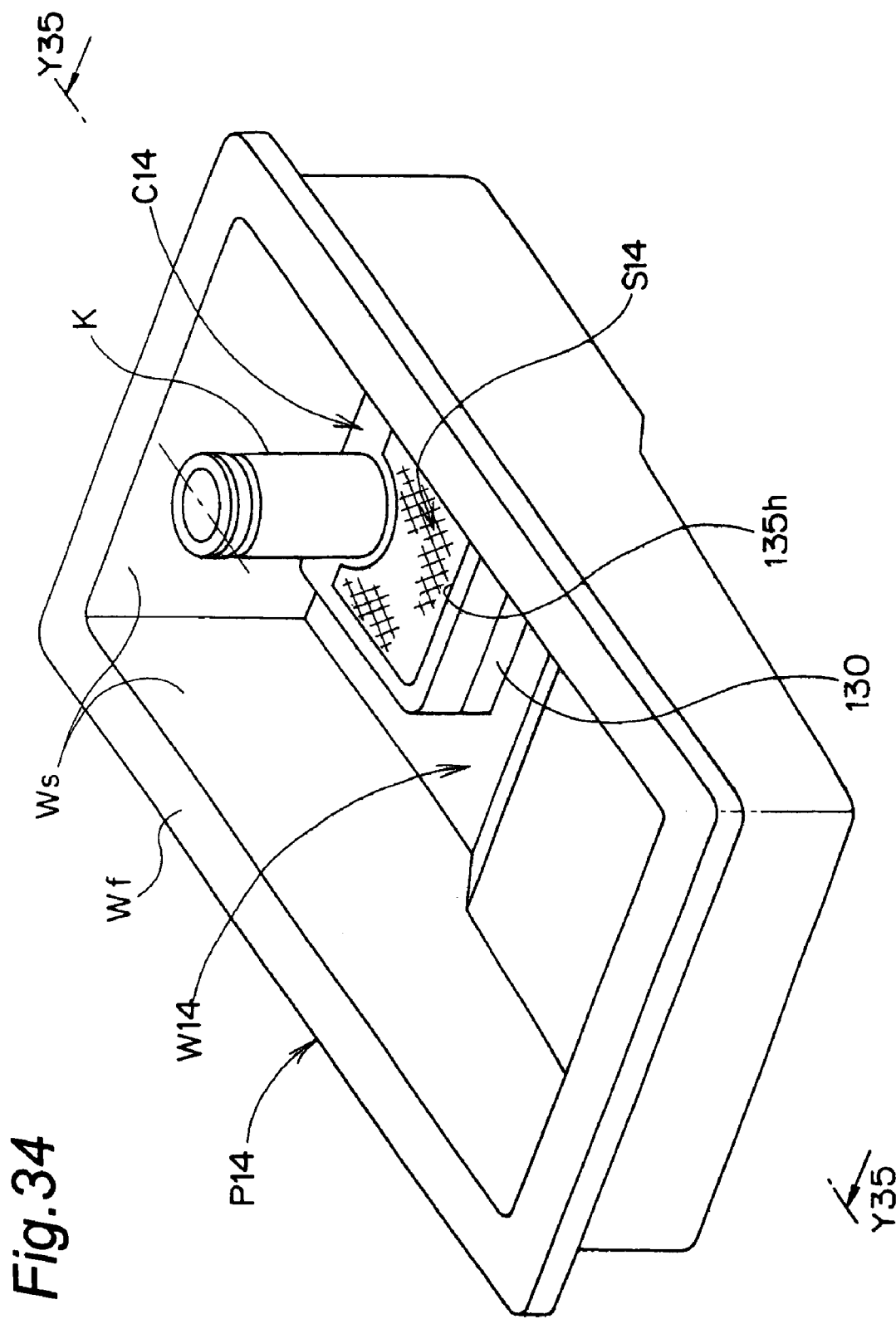
FIG. 34 is a perspective view of an entire oil pan of an eleventh embodiment.
Figure 35:
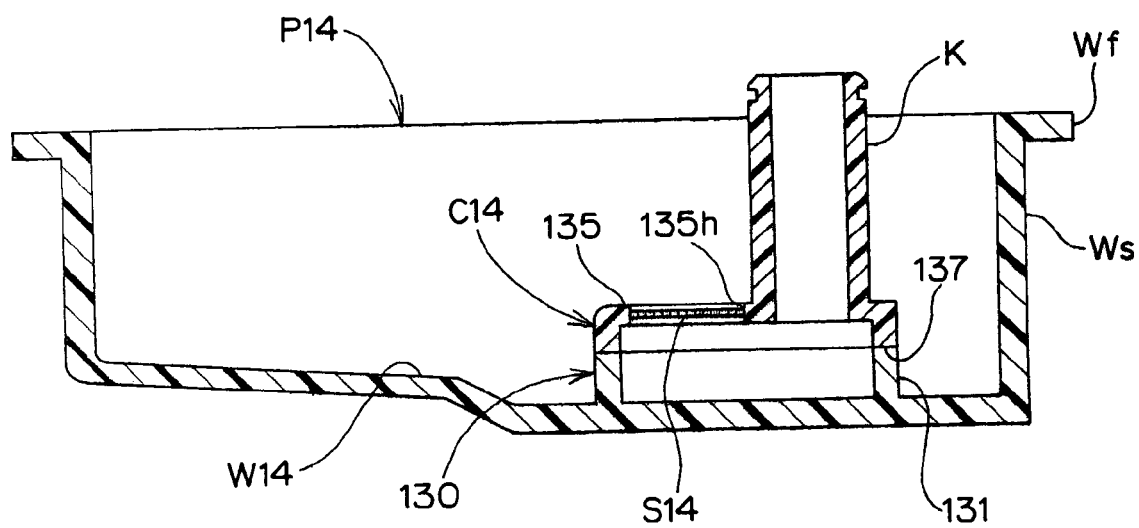
FIG. 35 is an explanatory sectional view of the oil pan taken along the line Y35-Y35 in FIG. 34.
Figure 36:
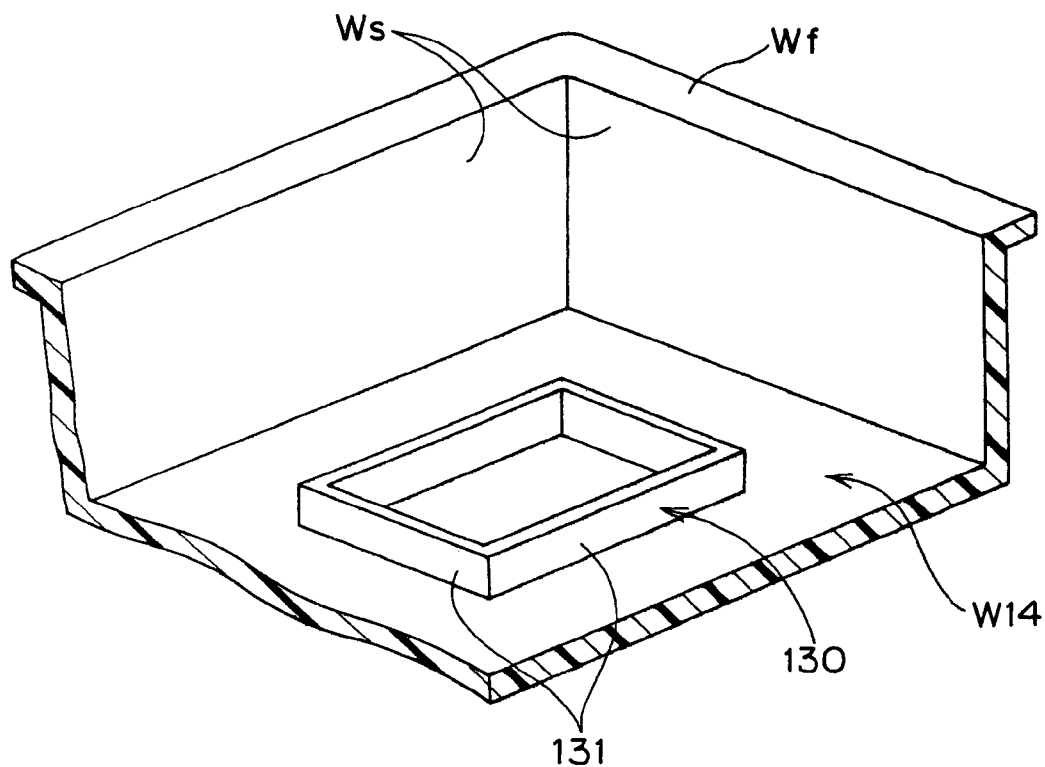
FIG. 36 is a partial perspective view showing an essential portion of an interior structure of the oil pan of the eleventh embodiment.
Figure 37:
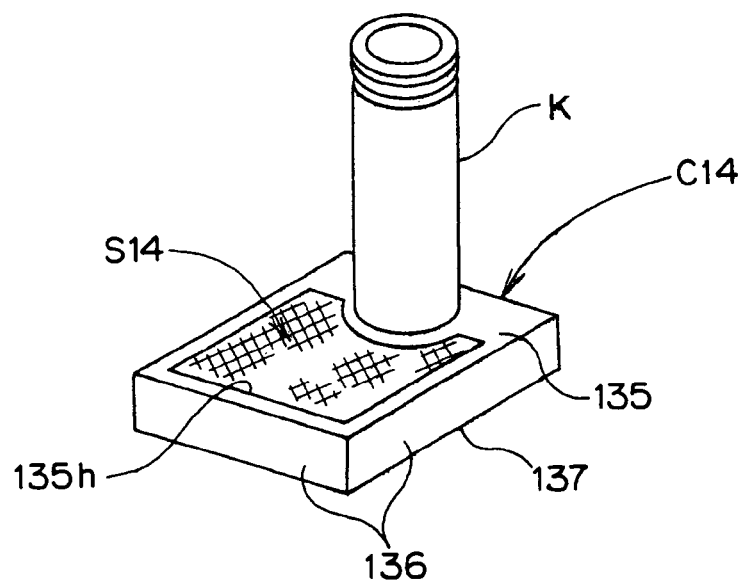
FIG. 37 is a perspective view of an entire cover body of the eleventh embodiment.

FIG. 34 is a perspective view of an entire oil pan of an eleventh embodiment. FIG. 35 is an explanatory sectional view of the oil pan taken along the line Y35-Y35 in FIG. 34. FIG. 36 is a partial perspective view showing an essential portion of an interior structure of the oil pan of the eleventh embodiment. FIG. 37 is a perspective view of an entire cover body of the eleventh embodiment.

According to an oil pan P14 of the eleventh embodiment, a bottom wall W14 is integrally provided at its predetermined portion with a cylindrical portion 130 having a predetermined height. The cylindrical portion 130 has a substantially rectangular upper opening which is surrounded by vertical walls 131 and opened upwardly. The outer shape of the cylindrical portion 130 is similar to the cylindrical portion 120 of the tenth embodiment, but the cylindrical portion 130 is not provided with the notch 121h and step 122 of the tenth embodiment.

As shown in FIG. 37, a cover body C14 of the embodiment has an outer shape similar to that of the third embodiment. The cover body C14 is formed into a substantially rectangular parallelepiped box-like shape which is downwardly opened. An oil pipe K is integrally stood on an upper surface 135 of the cover body C14. An outer size of the cover body C14 as viewed from above is set to substantially the same as an outer size of the cylindrical portion 130 as viewed from above. A side surface 136 of the cover body C14 is not provided with opening like the tenth embodiment.

In this embodiment, the cover body C14 (concretely, its upper surface 135) is formed with an opening 135h through which oil flows into the hollow of the cover body C14. The cover body C14 is integrally formed with a screen Sidewall 14 as a filtering element such as to cover the opening 135h.

In this case, more preferably, both the screen S14 and c14 are compacts made of synthetic resin, and they are integrally formed together. Alternatively, they may be formed separately and then, they may integrally be formed together by welding or adhesion, for example. Further, the screen S14 may be formed of metal such as metal mesh or metal porous plate, the metal screen S14 may be set in a synthetic resin mold of the cover body C14, and the cover body C14 and the screen S14 may integrally be formed by so-called insert molding.

When the cover body C14 is fixed to the oil pan bottom wall W14, the cover body C14 is disposed and fixed such that a lower surface 137 of the cover body C14 is located on an upper surface of the vertical wall 131 of the cylindrical portion 130. As a fixing method, the same method as that of the eighth embodiment can be applied.

According to this structure, oil flows into the hollow of the cover body C14 from the opening 35h formed in the upper surface of the cover body C14, and the oil is filtered by the screen S14 and flows toward the oil pipe K.

According to this embodiment, the same effect as that of the eighth embodiment can be obtained basically. Especially, the opening 135h through which oil flows into the hollow of the cover body C14 is formed in the cover body C14 itself, and the screen S14 and the cover body C14 are integrally provided together such as to cover the opening 135h. Therefore, it is unnecessary to handle the filtering element and the cover body C14 as separate parts, the number of parts can be reduced, and the fixing operation when the cover body C14 is fixed to the bottom wall W14 of the oil pan P14 is facilitated.

The same opening and screen as the opening 135h and the screen S14 provided in the upper surface 35 of the cover body C14 may also be provided on the side surface 136.

Figure 38:
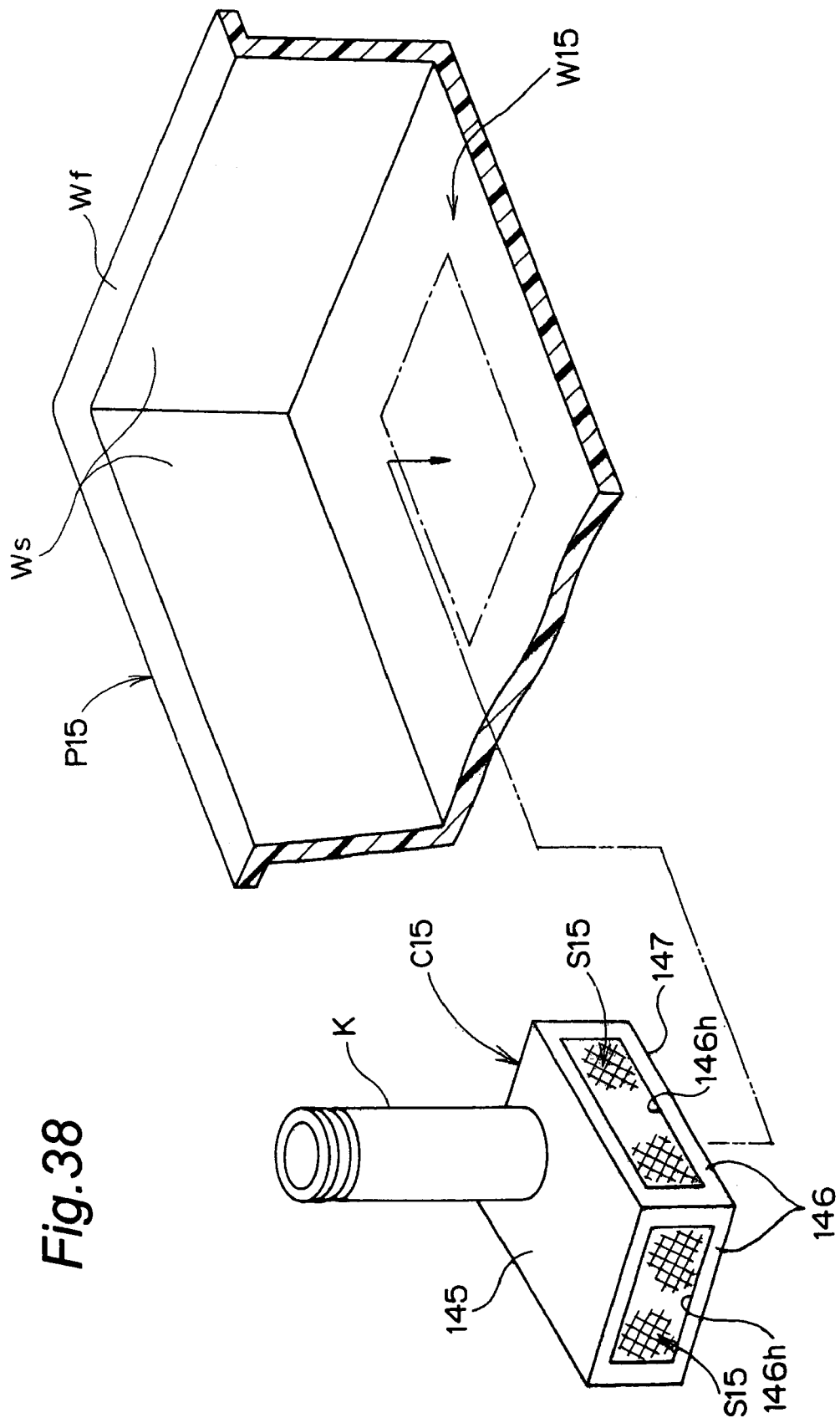
FIG. 38 is a perspective view showing an interior structure of an oil pan and a cover body according to a twelfth embodiment of the invention.

FIG. 38 is a perspective view showing an interior structure and a cover body of an oil pan according to a twelfth embodiment. This embodiment is a modification of the eleventh embodiment.

In the twelfth embodiment, a bottom wall W15 of an oil pan P15 is not provided with a cylindrical portion of the eleventh embodiment, and the bottom wall W15 is formed into a flat shape. The cover body C15 is formed at its side surfaces 146 not an upper surface 145 with openings 146h, respectively, and screens S15 and the cover body C15 are integrally formed together in the same manner as that of the eleventh embodiment such that the screens S15 covers the openings 146h.

When the cover body C15 is fixed to the oil pan bottom wall W15, it is unnecessary to dispose a lower surface 147 of the cover body C15 such that the lower surface 147 is located on the upper surface of the vertical wall 31 of the cylindrical portion 30 as in the fourth embodiment, and the cover body C15 can stably be disposed and easily fixed to the flat bottom wall W15.

According to this structure, oil flows into the hollow of the cover body C15 from the opening 146h formed in each side surface 146 of the cover body C15, and the oil is filtered by the screen S15 and flows toward the oil pipe K.

The same opening and screen as the opening 146h and the screen S15 provided on the side surface 146 of the cover body C15 may also be provided on the upper surface 145 as in the eleventh embodiment.

In the eleventh and twelfth embodiments also, the oil pans P14, P15 and the cover bodies C14, C15 are made of synthetic resin. Since they are made of synthetic resin, the same effect as that of the eighth embodiment can be obtained. Especially in the eleventh embodiment, since the oil pan P14 is made of synthetic resin, it is possible to easily form the cylindrical portion 130 on the bottom wall W14 of the oil pan P14.

In the above embodiments, the oil pan is added to a lower portion of an engine (not shown) of an automobile, but the present invention is not limited to such a case, and may effectively be applied to an oil pan added to a lower portion of a transmission, and to another oil pans provided in an oil circulatory systems such as various mechanical apparatuses and power apparatuses.

The present invention is not limited to the embodiments, and may variously be modified and improved within a range not departing from a subject matter of the invention of course.

The present invention relates to an oil pan provided in an oil circulatory system such as a mechanical apparatus or a power apparatus, and more particularly, to an oil pan with a built-in filtering element. The invention provides an oil pan with a built-in filtering element which is less subject to lateral swing of oil, supporting rigidity of the filter is high, or the assembling operability of the filter is excellent, and to provide an oil pan with a built-in filtering element which is less prone to receive influence of vibration input to the oil pan or freedom degree of design with respect to position change of the oil pump, and to provide an oil pan with a built-in filtering element which is lighter than that of the conventional oil pan. The invention can effectively utilized as an oil pan added to a lower portion of an engine or transmission of a vehicle such as an automobile.

What is claimed is:

1. An oil pan with a built-in filtering element having an oil flow path which is in communication with an oil pump for filtering oil flowing toward the oil pump, wherein
the oil flow path includes a bottom flow path having a flow path wall extending along a bottom wall of the oil pan and a side flow path having a flow path wall extending along a sidewall of the oil pan, the bottom flow path extending between an upstream end and a downstream end,
the sidewall has a drain hole which is opened at the bottom flow path, the filtering element can be inserted into the bottom flow path through the drain hole, and the filtering element extends from a first end to a second end,
the bottom flow path is provided with a filtering element retaining portion at an upper portion of the upstream end of the bottom flow path, the filtering element retaining portion being configured to retain the first end of the filtering element,
the drain hole is provided with a plug fixing portion for fixing a closing plug which closes the drain hole at the downstream end of the bottom flow path,
the closing plug is formed with a filtering element receiver provided at a tip end of the closing plug, the second end of the filtering element inserted into the bottom flow path is abutted against the filtering element receiver,
the bottom flow path is integrally formed on the bottom wall of the oil pan,
the upstream end of the bottom flow path opens to a space of the oil pan, and the downstream end of the bottom flow path extends to the sidewall of the oil pan,
the filtering element includes a screen, the screen is planar and has a rectangular shape when viewed from above, the filter element further includes a frame integrally surrounding a peripheral edge of the screen, the frame is planar as a whole and has a periphery having a rectangular shape when viewed from above, and the periphery of the frame includes a first end and a second end,
the filtering element is inserted into the bottom flow path from the drain hole, in a state where the closing plug is removed from the drain hole,
the first end of the filtering element is retained at the upstream end of the bottom flow path with the first end of the periphery of the frame received by the filtering element retaining portion of the bottom flow path, and the second end of the filtering element is received at the downstream end of the bottom flow path with the second end of the periphery of the frame received by the filtering element receiver of the closing plug, such that the filtering element is secured in the bottom flow path to filter oil flow, and
the filtering element is assembled in the bottom flow path such that the filtering element is inclined downwardly with respect to a longitudinal centerline of the bottom flow path from the first end toward the second end.

2. The oil pan with a built-in filtering element according to claim 1, wherein a side of the filtering element is formed with a projection which extends substantially along an insertion direction of the filtering element having a predetermined width, an inner surface of a sidewall of the bottom flow path is formed with a fitting groove into which the projection is fitted when the filtering element is inserted.

3. The oil pan with built-in filtering element according to claim 1, wherein the filtering element comprises a first filtering element located relatively upstream side from the oil flow path and a second filtering element located downstream from the first filtering element, a mesh of the second filtering element is set finer than that of the first filtering element.

4. The oil pan with a built-in filtering element according to claim 1, wherein the oil pan is made of synthetic resin.

* * * * *